US011312116B2

(12) United States Patent
Fukuda et al.

(10) Patent No.: US 11,312,116 B2
(45) Date of Patent: Apr. 26, 2022

(54) BORIDE PARTICLES, BORIDE PARTICLE DISPERSED LIQUID, INFRARED LIGHT SHIELDING TRANSPARENT BASE, INFRARED LIGHT SHIELDING OPTICAL MEMBER, INFRARED LIGHT SHIELDING PARTICLE DISPERSED BODY, INFRARED LIGHT SHIELDING LAMINATED TRANSPARENT BASE, INFRARED LIGHT SHIELDING PARTICLE DISPERSED POWDER, AND MASTER BATCH

(71) Applicant: SUMITOMO METAL MINING CO., LTD., Tokyo (JP)

(72) Inventors: Kenji Fukuda, Isa (JP); Mitsunobu Miratsu, Isa (JP); Hirofumi Tsunematsu, Isa (JP); Takeshi Chonan, Isa (JP)

(73) Assignee: SUMITOMO METAL MINING CO., LTD., Tokyo (JP)

( * ) Notice: Subject to any disclaimer, the term of this patent is extended or adjusted under 35 U.S.C. 154(b) by 252 days.

(21) Appl. No.: 16/067,644

(22) PCT Filed: Dec. 28, 2016

(86) PCT No.: PCT/JP2016/089095
§ 371 (c)(1),
(2) Date: Jul. 2, 2018

(87) PCT Pub. No.: WO2017/119394
PCT Pub. Date: Jul. 13, 2017

(65) Prior Publication Data
US 2019/0016602 A1    Jan. 17, 2019

(30) Foreign Application Priority Data

| Jan. 4, 2016 | (JP) | JP2016-000298 |
| Jan. 4, 2016 | (JP) | JP2016-000300 |
| Jan. 4, 2016 | (JP) | JP2016-000301 |
| Dec. 27, 2016 | (JP) | JP2016-254433 |
| Dec. 27, 2016 | (JP) | JP2016-254437 |
| Dec. 27, 2016 | (JP) | JP2016-254440 |

(51) Int. Cl.
| C01B 35/04 | (2006.01) |
| C09D 5/32 | (2006.01) |
| C09D 169/00 | (2006.01) |
| C09D 7/40 | (2018.01) |
| G02B 5/20 | (2006.01) |
| B32B 27/20 | (2006.01) |
| B32B 17/10 | (2006.01) |
| C08K 3/38 | (2006.01) |

(52) U.S. Cl.
CPC ........ *B32B 27/20* (2013.01); *B32B 17/10633* (2013.01); *B32B 17/10761* (2013.01); *C01B 35/04* (2013.01); *C09D 7/67* (2018.01); *C01P 2004/64* (2013.01); *C08K 3/38* (2013.01); *C08K 2201/005* (2013.01); *C08K 2201/011* (2013.01); *Y10T 428/25* (2015.01)

(58) Field of Classification Search
CPC ........ B32B 17/10761; B32B 17/10633; C01B 35/04; C04B 35/5156; C04B 35/62222; C04B 35/634; C04B 2235/9646; C09D 7/67; C09D 5/32; C09D 169/00; C08J 3/226; C08J 5/18; C08K 3/38; C08K 2201/005; C08K 2201/011; C01P 2004/64; C01P 2006/66; C01P 2002/82; G01J 3/0205; G01J 3/0251; G02B 5/206; G02B 5/208; G02B 5/20
See application file for complete search history.

(56) References Cited

U.S. PATENT DOCUMENTS

| 6,060,154 | A | 5/2000 | Adachi et al. |
| 2003/0054160 | A1* | 3/2003 | Fisher ................ C08K 3/38 |
| | | | 428/328 |
| 2004/0028920 | A1 | 2/2004 | Fujita et al. |
| 2006/0009559 | A1 | 1/2006 | Fujita et al. |
| 2009/0136730 | A1 | 5/2009 | Nakano et al. |
| 2009/0291295 | A1 | 11/2009 | Chung et al. |
| 2013/0017137 | A1* | 1/2013 | Takahashi ............ C23C 14/35 |
| | | | 423/289 |
| 2014/0061553 | A1 | 3/2014 | Hattori et al. |

FOREIGN PATENT DOCUMENTS

| CN | 101151321 | 3/2008 |
| EP | 2192093 | 6/2010 |
| JP | H04-243913 | 9/1992 |
| JP | H11-181336 | 7/1999 |

(Continued)

OTHER PUBLICATIONS

Ando et al., JP2011063487A, Mar. 31, 2011 (Machine translation) (Year: 20 11).*
V. Domnich et al., Boron Carbide: Structure, Properties, and Stability under Stress, J. Am. Ceram. Soc., (2011) vol. 94, Issue 11, pp. 3605-3628.
X. H. Zhao et al., The influence of argon pressure on the structural and physical properties of LaB6 films, App. Mech. Mater., (2011) vol. 55-57, pp. 1436-1440.
International Search Report dated Feb. 7, 2017 with respect to PCT/JP2016/089095.
D. Chen et al., The preparation and composition design of boron-rich lanthanum hexaboride target for sputtering, Journal of Alloys and Compounds, Jul. 25, 2015, vol. 638, pp. 380-386, ISSN 0925-8388, particularly. Table 1.

(Continued)

*Primary Examiner* — Cheng Yuan Huang
(74) *Attorney, Agent, or Firm* — IPUSA, PLLC

(57) ABSTRACT

Boride particles represented by a general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating an amount of boron in the general formula) are provided, wherein an amount of carbon included in the boride particles is 0.2% by mass or less, as measured by a combustion-infrared absorption method.

7 Claims, 1 Drawing Sheet

(56) References Cited

FOREIGN PATENT DOCUMENTS

| JP | 2000-096034 | | 4/2000 |
|---|---|---|---|
| JP | 2001-314776 | | 11/2001 |
| JP | 2004-059875 | | 2/2004 |
| JP | 2004-237250 | | 8/2004 |
| JP | 2009-150979 | | 7/2009 |
| JP | 2009-265485 | | 11/2009 |
| JP | 2011-063486 | | 3/2011 |
| JP | 2011063487 A | * | 3/2011 |
| JP | 2012-214374 | | 11/2012 |
| JP | 2014-062031 | | 4/2014 |
| JP | 2014-141376 | | 8/2014 |

OTHER PUBLICATIONS

S. Otani et al., Removal of carbon impurities from boride powders:ZrB2, NbB2, CrB2, and LaB6, Journal of Alloys and Compounds, Feb. 21, 2007, vol. 429 No. 1-2, pp. 321-323 ISSN 0925-8388, particularly, Table 1, Fig.3, p. 323, right col. lines 1 to 7.

Informal Comments submitted on Jun. 14, 2017 for PCT/JP2016/089095.

Kenji Adachi et al: "Absorption and scattering of near-infrared light by dispersed lanthanum hexaboride nanoparticles for solar control filters", Journal of Materials Research, vol. 25, No. 03, Mar. 1, 2010 (Mar. 1, 2010), pp. 510-521, XP55034357, ISSN: 0884-2914, DOI: 10.1557/JMR.2010.0075.

* cited by examiner

BORIDE PARTICLES, BORIDE PARTICLE DISPERSED LIQUID, INFRARED LIGHT SHIELDING TRANSPARENT BASE, INFRARED LIGHT SHIELDING OPTICAL MEMBER, INFRARED LIGHT SHIELDING PARTICLE DISPERSED BODY, INFRARED LIGHT SHIELDING LAMINATED TRANSPARENT BASE, INFRARED LIGHT SHIELDING PARTICLE DISPERSED POWDER, AND MASTER BATCH

TECHNICAL FIELD

The present invention relates to boride particles, a boride particle dispersed liquid, an infrared light shielding transparent base, an infrared light shielding optical member, an infrared light shielding particle dispersed body, an infrared light shielding laminated transparent base, an infrared light shielding particle dispersed powder, and a master batch.

BACKGROUND ART

Conventionally, boride particles of a rare earth element such as La are produced by combining the particles by a solid phase reaction method and pulverizing the particles by a dry pulverization method, and in particular, a general method is performed by pulverizing the particles by causing the particles to collide with each other by a high-speed air current such as a jet mill. Among the boride particles of a rare earth element, for example, lanthanum hexaboride is obtained by heating a lanthanum oxide and a boron oxide to a high temperature in the presence of carbon, and subsequently pulverizing the lanthanum oxide and the boron oxide by a dry pulverizing apparatus. Note that the method of finely pulverizing a powder using a by jet mill is disclosed in, for example, Patent Literature 1.

These boride particles have been conventionally used for a thick film resistor paste, etc., and when used as fine particles, the boride particles can be used as an optical material for solar radiation shielding. That is, a film in which the boride particles are dispersed is capable of transmitting visible light beams and efficiently shielding near-infrared light acting as thermal energy, and therefore it is known that such a film is suitable as a solar radiation shielding material to be applied to windows of houses and automobiles, etc. (for example, see Patent Literature 2 and 3).

However, there has been a problem that borides of rare earth elements such as La are hard, and therefore it is difficult to pulverize the borides into fine particles by a dry pulverization method using a jet mill, etc., and only relatively large particles of approximately 1 μm to 3 μm can be obtained. Furthermore, it has been difficult to suppress the reaggregation of the boride particles obtained by the dry pulverization method.

In subsequent studies, it has been found that the average dispersed particle diameter of the boride particles can be reduced to 200 nm or less by processing the boride particles by a medium stirring mill (see, for example, Patent Literature 4). Accordingly, boride particles having an average dispersed particle diameter of approximately 200 nm can be obtained economically. If boride particles having an average dispersed particle diameter of 200 nm or less are used, geometric scattering or Mie scattering, which occurs when the particle diameter is larger than 200 nm, can be reduced. For this reason, it is possible to prevent a phenomenon in which light in the visible light region of 400 nm to 780 nm is scattered such that the glass becomes like frosted glass, and an optical member, placing importance on transparency, can be obtained.

However, with respect to an infrared light shielding optical member in which the boride particles described above are dispersed as infrared light shielding particles, there are cases where a phenomenon in which the infrared light shielding optical member is colored to bluish white occurs when irradiated with intense light such as sunlight or spotlight (hereinafter, such a phenomenon may be referred to as "blue haze" in some cases). When such a blue haze occurs, there has been a problem that the aesthetic appearance of the infrared light shielding optical member may be impaired.

When the average dispersed particle diameter of the boride particles becomes 200 nm or less, it is known that the geometric scattering or the Mie scattering is reduced, and most of the scattering follows the Rayleigh scattering with a scattering coefficient defined by the following formula (1).

$$S = [16\pi^5 r^6 / 3\lambda^4] \cdot [(m^2-1)/(m^2+2)]^2 \cdot [m] \quad (1)$$

[where S is the scattering coefficient, $\lambda$ is the wavelength, r is the particle diameter, $m = n_1/n_0$, $n_0$ is the refractive index of the substrate, and $n_1$ is the refractive index of the dispersed substance]

The Rayleigh scattering is the scattering of light by particles smaller in size than the wavelength of the light. From the above formula (1), the Rayleigh scattering is inversely proportional to the fourth power of the wavelength ($\lambda$), and therefore it is understood that many blue light beams with short wavelengths are scattered such that the infrared light shielding optical member is colored to bluish white.

Furthermore, in the Rayleigh scattering region, the scattered light is proportional to the sixth power of the particle diameter (r) from the above formula (1), and therefore it is understood that by reducing the particle diameter, the Rayleigh scattering can be reduced and the occurrence of blue haze can be suppressed.

For example, Patent Literature 5 discloses an example in which occurrence of blue haze can be suppressed by making the average dispersed particle diameter 85 nm or less.

CITATION LIST

Patent Literature

[PTL 1]
Japanese Unexamined Patent Application Publication No. 2001-314776
[PTL 2]
Japanese Unexamined Patent Application Publication No. 2000-096034
[PTL 3]
Japanese Unexamined Patent Application Publication No. H11-181336
[PTL 4]
Japanese Unexamined Patent Application Publication No. 2004-237250
[PTL 5]
Japanese Unexamined Patent Application Publication No. 2009-150979

Non Patent Literature

[NPL 1]
V. Domnich et al., J. Am. Ceram. Soc., (2011) vol.94, Issue 11, pp. 3605-3628
[NPL 2]
X. H. Zhao et al., App. Mech. Mater., (2011) vol.55-57, pp. 1436-1440

SUMMARY OF INVENTION

Technical Problem

However, when attempting to pulverize the conventionally used boride particles to have an average dispersed particle diameter of 85 nm or less by the pulverization method using a medium stirring mill disclosed in Patent Literature 4, the viscosity of the slurry is increased and the pulverization process has been difficult in some cases.

Therefore, in order to further reduce the average dispersed particle diameter by continuing the pulverization process to suppress the blue haze, it is necessary to reduce the viscosity by extremely lowering the concentration of the boride particles in the slurry, and therefore there has been a program that the pulverization efficiency is poor and the process is uneconomical.

Therefore, in view of the problems of the above-described conventional technology, it is an object of one aspect of the present invention to provide boride particles that can be easily pulverized.

Solution to Problem

According to an aspect of the present invention for solving the above problems, boride particles represented by a general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating an amount of boron in the general formula) are provided, wherein an amount of carbon included in the boride particles is 0.2% by mass or less, as measured by a combustion-infrared absorption method.

Advantageous Effects of Invention

According to an aspect of the present invention, boride particles that can be easily pulverized, can be provided.

DESCRIPTION OF EMBODIMENTS

Figure 1:
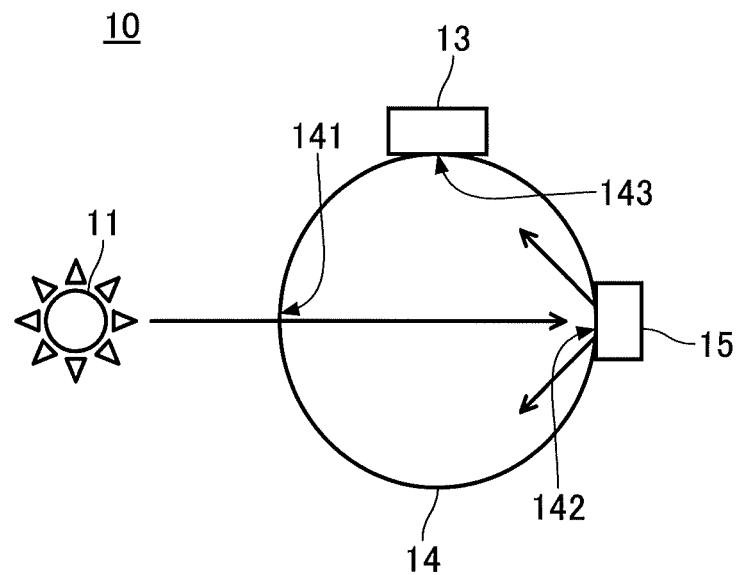
FIG. 1 is an explanatory diagram (part 1) illustrating a measurement principle of a transmitted scattered light profile of an infrared light shielding particle dispersed body, etc., according to an embodiment of the present invention.

Hereinafter, embodiments for carrying out the present invention will be described with reference to the drawings. However, the present invention is not limited to the following embodiments, and various modifications and substitutions may be made to the following embodiments without departing from the scope of the present invention.

(Boride Particles)

In the present embodiment, a configuration example of boride particles will be described first.

The boride particles according to the present embodiment are related to boride particles represented by a general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula). Then, the amount of carbon included in the boride particles may be 0.2% by mass or less, as measured by a combustion-infrared absorption method.

The inventors of the present invention conducted intensive studies on boride particles that can be easily finely pulverized, that is, pulverized into fine particles. Then, the inventors found out that the by setting the amount of carbon (carbon concentration) in the boride particles to be less than or equal to a predetermined value, it is possible to obtain boride particles that can be easily finely pulverized, and completed the present invention.

The boride particles according to the present embodiment may be boride particles represented by the general formula $XB_m$ as described above.

In the boride particles according to the present embodiment represented by the above general formula $XB_m$, m, which is the element ratio (molar ratio) (B/X) of boron (B) to the metal element (X), is not particularly limited but is preferably 3.0 or more and 20.0 or less.

Examples of the boride constituting the boride particles represented by the general formula $XB_m$ include $XB_4$, $XB_6$, $XB_{12}$, etc. However, from the viewpoint of selectively and efficiently lowering the transmittance of light in the near-infrared region around a wavelength of 1000 nm, it is preferable that the boride particles according to the present embodiment are mainly composed of $XB_4$ or $XB_6$, and may partially include $XB_{12}$.

Therefore, in the general formula $XB_m$, m, which is the element ratio (B/X) of boron (B) to the metal element (X), is more preferably 4.0 or more and 6.2 or less.

Note that when the above (B/X) is 4.0 or more, generation of XB, $XB_2$, etc., can be suppressed, and although the reason is unclear, the solar radiation shielding properties can be improved. Furthermore, when the above (B/X) is 6.2 or less, it is possible to increase the content of hexaboride, which is particularly excellent in solar radiation shielding properties, and it is therefore preferable in that the solar radiation shielding properties are improved.

In particular, it is preferable that the boride particles according to the present embodiment are mainly composed of $XB_6$ among borides, because $XB_6$ has a high capability of absorbing near-infrared light.

Therefore, in the boride particles according to the present embodiment represented by the general formula $XB_m$, m, which is the element ratio (B/X) of boron (B) to the metal element (X), is even more preferably 5.8 or more and 6.2 or less.

Note that in the case of producing boride particles, the powder including boride particles to be obtained is not constituted solely of boride particles having a single composition, but may be particles including boride of a plurality of compositions. Specifically, the particles may be a mixture of borides such as $XB_4$, $XB_6$, and $XB_{12}$, for example.

Therefore, for example, when X-ray diffraction measurement is carried out with respect to particles of hexaboride that is a representative boride particle, even when a single phase is found by analysis of X-ray diffraction, it is considered that the particles actually include a trace amount of other phases.

Therefore, m in the general formula $XB_m$ of the boride particles according to the present embodiment can be the atomic ratio of boron (B) to one atom of an X element, for example, when chemically analyzing the powder including the obtained boride particles by ICP emission spectroscopy (high-frequency inductively coupled plasma emission spectroscopy).

The metal element (X) in the boride particles according to the present embodiment is not particularly limited as in the above general formula; for example, the metal element (X) may be at least one kind of metal element selected from Y, La, Ce, Pr, Nd, Sm, Eu, Gd, Tb, Dy, Ho, Er, Tm, Yb, Lu, Sr, Ca.

However, lanthanum hexaboride, which is a hexaboride of lanthanum, has a particularly high capability of absorbing near-infrared light, and therefore the boride particles according to the present embodiment preferably include lanthanum hexaboride particles.

Furthermore, as described above, according to the studies by the inventors of the present invention, the by setting the amount of carbon (carbon concentration) in the boride particles to be less than or equal to a predetermined value, it is possible to obtain boride particles that can be easily pulverized. The reason for this will be described below.

According to studies by the inventors of the present invention, there are cases where the carbon included in the boride particles forms a carbon compound with the components of the boride particles, or cases where the carbon compound included in the raw material remains.

Examples of such carbon compounds include $LaB_2C_2$, $LaB_2C_4$, $B_4C$, $B_{4.5}C$, $B_{5.6}C$, $B_{6.5}C$, $B_{7.7}C$, $B_9C$, etc.

According to Non Patent Literature 1, among the above carbon compounds, $B_4C$, $B_{4.5}C$, $B_{5.6}C$, $B_{6.5}C$, $B_{7.7}C$,l and $B_9C$ have a Young's modulus, which is an index of hardness, of 472 GPa, 463 GPa, 462 GPa, 446 GPa, 352 GPa, and 348 GPa, respectively, and are carbon compounds having a high hardness.

On the other hand, Non Patent Literature 2 reports that the Young's modulus of lanthanum hexaboride, for example, is 194 GPa. Furthermore, other boride particles are assumed to have the same Young's modulus.

As described above, in some cases, the carbon compound mixed as an impurity has a higher Young's modulus than the boride particles that is the target. Therefore, in order to obtain boride particles that can be finely pulverized easily, it is desired to suppress the contamination of these carbon compounds.

The contamination amount (inclusion amount) of these carbon compounds is correlated with the amount of carbon in the boride particles, and therefore by setting the amount of carbon in the boride particles to less than or equal to a predetermined value as described above, it is considered that boride particles that can be finely pulverized easily can be obtained.

The amount of carbon included in the boride particles according to the present embodiment can be measured by a combustion-infrared absorption method. The amount of carbon included in the boride particles according to the present embodiment, measured by the combustion-infrared absorption method, is preferably 0.2% by mass or less, and more preferably 0.1% by mass or less.

Furthermore, particularly in the boride particles, $B_4C$ (boron carbide) among the above-described carbon compounds tends to be generated, and therefore it is also preferable to suppress the amount of $B_4C$ included in the boride particles according to the present embodiment. For example, the content (content ratio) of $B_4C$ in the boride particles according to the present embodiment is preferably 1.0% by mass or less.

When the amount of $B_4C$ included in the boride particles according to the present embodiment, that is, the content ratio of $B_4C$, is 1.0% by mass or less, the content of other carbon compounds can also be suppressed, and boride particles that can be finely pulverized particularly easily can be made, which is preferable.

The amount of $B_4C$ included in the boride particles according to the present embodiment can be measured by ICP analysis by pretreatment of nitric acid dissolution and filtration/separation.

It is known that $B_4C$ hardly dissolves in nitric acid. On the other hand, boride particles are known to dissolve in nitric acid.

Therefore, when evaluating the amount of $B_4C$ in the boride particles, by adding the boride particles to nitric acid, dissolving the boride particles, and subsequently filtering and separating the undissolved residue, only the $B_4C$ particles in the boride particles can be extracted. Then, the $B_4C$ concentration can be calculated by dissolving the separated $B_4C$ particles with sodium carbonate and measuring the boron concentration by ICP analysis.

At this time, in order to confirm that the undissolved residue obtained after filtration/separation is $B_4C$, it is preferable to prepare a sample treated in parallel in the same manner up to the filtration/separation, and perform XRD measurement on the undissolved residue of the sample obtained after the filtration/separation to confirm the $B_4C$ single phase.

Incidentally, boride particles such as hexaboride particles are powders colored dark blue-purple, etc., but the boride particles are pulverized so that the particle diameter is sufficiently smaller than the visible light wavelength, and in the state of being dispersed in the film, visible light transmission occurs. At the same time, an infrared light shielding function is developed.

Although the reason for this has not been elucidated in detail, these boride materials possess a relatively large number of free electrons, and it is considered that the electrons are derived from the fact that absorption by band-to-band transition between 4f-5d and absorption by electron-electron and electron-phonon interactions occur in the near-infrared region.

According to experiments, it has been confirmed that in a film in which these boride particles are sufficiently finely and uniformly dispersed, the transmittance of the film has a maximum value in a wavelength region of 400 nm or more to 700 nm or less, and is a minimum value in a wavelength region of 700 nm or more to 1800 nm or less. Considering that the visible light wavelength is 380 nm or more and 780 nm or less and the visibility is a bell-shaped type having a peak at around 550 nm, it can be understood that such a film effectively transmits visible light and effectively absorbs and reflects solar radiation other than the visible light.

The average dispersed particle diameter of the boride particles according to the embodiment is preferably 100 nm or less, and more preferably 85 nm or less. Note that the average dispersed particle diameter referred to here can be measured by a particle diameter measuring device based on a dynamic light scattering method.

The lower limit value of the average dispersed particle diameter of the boride particles is not particularly limited; however, the lower limit value is preferably, for example, 1 nm or more. This is because it is industrially difficult to make the average dispersed particle diameter of the boride particles less than 1 nm.

The boride particles according to the present embodiment described above have a carbon amount of less than or equal to a predetermined value, and therefore the boride particles can be finely pulverized easily, for example, so that the average dispersed particle diameter becomes 100 nm or less, particularly 85 nm or less. Therefore, the infrared light shielding optical member in which the boride particles according to the present embodiment are dispersed, can suppress the occurrence of blue haze, even when irradiated with intense light such as sunlight or spotlight.

(Method of Producing Boride Particles)

Next, a configuration example of a method for producing boride particles according to the present embodiment will be described.

The method for producing the boride particles according to the present embodiment is not particularly limited as long as the boride particles to be obtained are represented by the general formula $XB_m$ (where X is at least one kind of metal element selected from Y, Y, La, Ce, Pr, Nd, Sm, Eu, Gd, Tb, Dy, Ho, Er, Tm, Yb, Lu, Sr, Ca), and the amount of carbon (carbon concentration) included in the boride particles when the boride particles are measured by the combustion-infrared absorption method, is 0.2% by mass or less.

As one configuration example of the method for producing the boride particles according to the present embodiment, for example, a solid phase reaction method using carbon or boron carbide as a reducing agent may be cited. Hereinafter, a case of producing boride particles using lanthanum as a metal element will be described as an example.

For example, boride particles using lanthanum as a metal element can be produced by calcining a mixture of a boron source, a reducing agent, and a lanthanum source.

Specifically, for example, when boron carbide is used as a boron source and a reducing agent and lanthanum oxide is used as the lanthanum source to produce lanthanum boride particles, first, a raw material mixture of boron carbide and lanthanum oxide is prepared. Subsequently, the raw material mixture is calcined in an inert atmosphere at a temperature of 1500° C. or higher, whereby the lanthanum oxide is reduced by the carbon in the boron carbide, and carbon monoxide and carbon dioxide are generated and the carbon is removed. Furthermore, lanthanum boride is obtained from the remaining lanthanum and boron.

Note that the carbon derived from boron carbide is not completely removed as carbon monoxide and carbon dioxide, but part of the carbon remains in the lanthanum boride particles and becomes impurity carbon. Therefore, when the proportion of boron carbide in the raw material is increased, the concentration of impurity carbon in the obtained lanthanum boride particles increases.

As described above, the powder including boride particles to be obtained is not constituted only by boride particles having a single composition, but by a mixture of particles such as $LaB_4$, $LaB_6$, $LaB_{12}$, etc. Therefore, when X-ray diffraction measurement is carried out on the powder including the obtained boride particles, even when a single phase is found with respect to the boride by analysis of X-ray diffraction, it is considered that the boride actually include a trace amount of other phases.

Here, in the case of producing boride particles using lanthanum as a metal element as described above, the element ratio B/La of boron in the boron source and the lanthanum in the lanthanum source in the raw material, is not particularly limited; however, the element ratio B/La is preferably 3.0 or more and 20.0 or less.

In particular, when the element ratio B/La of boron in the boron source and lanthanum element in the lanthanum source in the raw material is 4.0 or more, generation of LaB, $LaB_2$, etc., can be suppressed. Also, although the reason is not clear, solar radiation shielding properties can be improved.

On the other hand, when the element ratio B/La of boron in the boron source and lanthanum in the lanthanum source in the raw material is 6.2 or less, generation of boron oxide particles other than the boride particles is suppressed. The boron oxide particles are hygroscopic, and therefore if boron oxide particles are mixed in the powder including boride particles, the humidity resistance of the powder including the boride particles is lowered and the time degradation of the solar radiation shielding properties becomes large.

Therefore, it is preferable to suppress the generation of boron oxide particles by setting the element ratio B/La of boron in the boron source and lanthanum in the lanthanum source in the raw material to 6.2 or less. Furthermore, when the element ratio B/La is 6.2 or less, it is possible to increase the content ratio of hexaboride, which is particularly excellent in solar radiation shielding properties, and therefore it is preferable because the solar radiation shielding properties are improved.

Furthermore, in order to reduce the impurity carbon concentration, it is effective to lower the proportion of boron carbide in the raw material as much as possible. Therefore, for example, by generating particles of lanthanum boride with the B/La set to 6.2 or less, a powder including particles of lanthanum boride having an impurity carbon concentration of 0.2% by mass or less can be more reliably obtained.

As described above, in the case of producing boride particles using lanthanum as the metal element, the element ratio (molar ratio) B/La of boron in the boron source and lanthanum in the lanthanum source is more preferably set as 4.0 or more and 6.2 or less. When the composition of the raw material is within the above range, it is possible to obtain a powder including lanthanum boride particles exhibiting high solar radiation shielding properties while at the same time, suppressing the concentration of impurity carbon in the powder including the obtained lanthanum boride particles, at a low level.

Particularly, the obtained lanthanum boride particles are preferably composed mainly of $LaB_6$. This is because $LaB_6$ has a particularly high capability of absorbing near-infrared light.

Therefore, it is more preferable that the element ratio B/La of boron in the boron source and lanthanum element in the lanthanum source in the raw material is 5.8 or more and 6.2 or less.

Note that the case where boron carbide is used as a boron source and reducing agent and lanthanum oxide is used as a lanthanum source to produce lanthanum boride particles, is described here as an example; however, the present embodiment is not limited as such. For example, it is also possible to use boron or boron oxide as a boron source, use carbon as a reducing agent, and use lanthanum oxide as a lanthanum source, respectively. In this case, it is preferable to conduct a preliminary test, etc., and select a mixing ratio of the components, so as to prevent excess carbon or oxygen from remaining in the product during the generation.

Furthermore, for example, a compound including the metal element X may be used instead of lanthanum oxide, depending on the metal element X included in the boride particles to be produced. Examples of the compound including, the metal element X include at least one kind of component selected from a hydroxide of the metal element X, a hydrate of the metal element X, and an oxide of the metal element X. A method of producing the compound including the metal element X is not particularly limited; however, for example, a solution including a compound including the metal element X and an alkaline solution may be reacted by stirring to generate a precipitate, and the compound may be obtained from the precipitate.

As described above, even in the case of using a compound including the metal element X instead of lanthanum oxide, it is preferable to conduct a preliminary test, etc., and select a mixing ratio of the components, so as to prevent excess carbon or oxygen from remaining in the product during the generation. For example, it is also possible to make the element ratio of boron in the boron source and the metal element X in the metal element X source, to be equal to the aforementioned element ratio of boron in the boron source and the lanthanum element in the lanthanum source.

The obtained boride particles can be made into boride particles having a desired average dispersed particle diameter, for example, by performing wet pulverization, etc.

(Boride Particle Dispersed Liquid)

Next, a configuration example of the boride particle dispersed liquid according to the present embodiment will be described.

The boride particle dispersed liquid according to the present embodiment can include the above-described boride particles and a liquid medium. Note that it is preferable that, for example, the boride particles are dispersed in a liquid medium.

The liquid medium used for the boride particle dispersed liquid may include one or more kinds selected from water, an organic solvent, fat and oil, liquid resin, and a plasticizer.

It is preferable that the organic solvent has a function of maintaining the dispersibility of the boride particles and a function of not causing coating defects when applying the dispersed liquid. Examples of the organic solvent include alcohol-based solvents such as methanol (MA), ethanol (EA), 1-propanol (NPA), isopropanol (IPA), butanol, pentanol, benzyl alcohol, diacetone alcohol, etc., ketone-based solvents such as acetone, methyl ethyl ketone (MEK), methyl propyl ketone, methyl isobutyl ketone (MIBK), cyclohexanone, isophorone, etc., ester-based solvents such as 3-methyl-methoxy-propionate (MMP), etc., glycol derivatives such as ethylene glycol monomethyl ether (MCS), ethylene glycol monoethyl ether (ECS), ethylene glycol isopropyl ether (IPC), propylene glycol methyl ether (PGM), propylene glycol ethyl ether (PE), propylene glycol methyl ether acetate (PGMEA), propylene glycol ethyl ether acetate (PE-AC), etc., amides such as formamide (FA), N-methylformamide, dimethylformamide (DMF), dimethylacetamide, N-methyl-2-pyrrolidone (NMP), etc., aromatic hydrocarbons such as toluene and xylene, etc., and halogenated hydrocarbons such as ethylene chloride and chlorobenzene, etc., and it is possible to use one kind or a combination of two or more kinds selected from the above.

Among the above, as an organic solvent, it is more preferable to use, in particular, ketones such as MIBK and MEK, aromatic hydrocarbons such as toluene and xylene, glycol ether acetates such as PGMEA and PE-AC, etc., having high hydrophobicity. Therefore, it is preferable to use one kind or a combination of two or more kinds selected from these materials.

As fat and oil, for example, it is possible to use one or more kinds selected from drying oils such as linseed oil, sunflower oil, tung oil, etc., semidrying oils such as sesame oil, cottonseed oil, rapeseed oil, soybean oil, rice bran oil, etc., non-drying oils such as olive oil, coconut oil, palm oil, dehydrated castor oil, etc., petroleum-based solvents such as fatty acid monoesters obtained by direct esterification reaction of fatty acids of vegetable oils and monoalcohols, ethers, Isopar E, Exxsol Hexane, Exxsol Heptane, Exxsol E, Exxsol D30, Exxsol D40, Exxsol D60, Exxsol D80, Exxsol D95, Exxsol D110, Exxsol D130 (manufactured by Exxon Mobil Corporation).

As the liquid resin, for example, it is possible to use one or more kinds selected from liquid acrylic resin, liquid epoxy resin, liquid polyester resin, and liquid urethane resin.

As the plasticizer, for example, a plasticizer for liquid plastics can be used. As plasticizers for liquid plastics, for example, it is possible to use one or more kinds selected from phthalic acid-based plasticizers such as DEHP and DINP, adipic acid-based plasticizers such as DINA and DOA, phosphate-based plasticizers, epoxy-based plasticizers, and polyester-based plasticizers.

Furthermore, the liquid medium used in the boride particle dispersed liquid according to the present embodiment may include, for example, a dispersant, a coupling agent, a surface active agent, etc., other than the above components. The dispersant, the coupling agent, and the surface active agent can be selected according to the application; but it is preferable to use one including a functional group selected from a group containing amine, a hydroxyl group, a carboxyl group, and an epoxy group. These functional groups are adsorbed on the surface of the boride particles and can prevent the aggregation of the boride particles. For example, in a boride particle dispersed body prepared by using the boride particle dispersed liquid, the functional group exhibits the effect of uniformly dispersing the boride particles.

As the dispersant, the coupling agent or the surface active agent, for example, a phosphate compound, a polymer-based dispersant, a silane-based coupling agent, a titanate-based coupling agent, an aluminum-based coupling agent, etc., is preferably used, but not limited so. As the polymer-based dispersant, acrylic-based polymer dispersant, urethane-based polymer dispersant, acrylic-based block copolymer polymer dispersant, polyether-based dispersant, polyester-based polymer dispersant, etc., may be used.acrylic-based polymer dispersant The addition amount of one or more kinds of materials selected from the dispersant, the coupling agent, and the surface active agent to the boride particle dispersed liquid is preferably in the range of 10 parts by weight or more and 1000 parts by weight or less and more preferably in the range of 20 parts by weight or more and 200 parts by weight or less, with respect to 100 parts by weight of the boride particles. When the addition amount of the dispersant, etc., is within the above range, the aggregation of the boride particles in the dispersed liquid is suppressed, and it is possible to maintain high dispersion stability, which is preferable.

The method of dispersing the boride particles in the liquid medium is not particularly limited. For example, a method of dispersing a raw material mixture of a boride particle dispersed liquid using a wet medium mill such as a bead mill, a ball mill, a sand mill, etc., may be cited. In particular, the boride particle dispersed liquid according to the present embodiment preferably has a state in which boride particles having an average dispersed particle diameter of 100 nm or less are dispersed in a liquid medium, and the average dispersed particle diameter of the boride particles is preferably 85 nm or less. Therefore, it is preferable to prepare a dispersed liquid by dispersing the boride particles by a wet pulverizing method using a medium stirring mill such as a bead mill.

In the case of preparing a boride particle dispersed liquid in which boride particles are dispersed in a dispersion medium (liquid medium), as the boride particle dispersed liquid, as described above, there is a method of adding boride particles and a dispersant, etc., which are the raw material, to water, an organic solvent, fat and oil, a liquid resin, a plasticizer, etc., which is a liquid medium, followed by performing dispersion treatment with a medium stirring mill, etc.

Furthermore, it is also possible to prepare a boride particle dispersed liquid by the following procedures. Here, a case of preparing a boride particle plasticizer dispersed liquid will be described as an example.

Specifically, first, a boride particle dispersed liquid in which boride particles are dispersed in an organic solvent, is previously prepared, by using the above-described organic solvent as a liquid medium. Subsequently, a plasticizer is added to the boride particle dispersed liquid, and the organic solvent is removed to obtain a boride particle plasticizer dispersed liquid.

Note that an example of the method of removing the organic solvent, is a method of drying the boride particle dispersed liquid under reduced pressure.

Specifically, the boride particle dispersed liquid in which an organic solvent is used a liquid medium and a plasticizer is added, is dried while being stirred under reduced pressure, such that the organic solvent components are separated. As a device used for the drying under reduced pressure, there is a vacuum stirring type drying machine; however, the device is not particularly limited as long as the device has the above functions. Furthermore, the pressure value at the time of depressurization is appropriately selected.

By using the above method of drying under reduced pressure, it is possible to improve the efficiency of removing the organic solvent from the boride particle dispersed liquid in which the organic solvent to which the plasticizer is added is used as a liquid medium, so that aggregation of the boride particles dispersed in the boride particle plasticizer dispersed liquid does not occur, which is preferable. Furthermore, the productivity of the boride particle plasticizer dispersed liquid is increased, and it is easy to recover the evaporated organic solvent, which is preferable from the viewpoint of environmental considerations.

Note that in order to obtain a uniform boride particle dispersed liquid, various additives or a dispersant may be added as described above, or the pH may be adjusted.

Furthermore, the case of preparing a boride particle plasticizer dispersed liquid using a plasticizer as a dispersion medium has been described as an example here; however, the present embodiment is not limited to such a mode, and instead of using a plasticizer, other kinds of dispersion media (liquid media) may be used, such as water, an organic solvent, fat and oil, liquid resin, etc., to obtain a dispersed liquid in which boride particles are dispersed in various kinds of dispersion media.

The content of boride particles in the boride particle dispersed liquid, that is, the concentration thereof, is not particularly limited; however, the content is preferably 0.01% by mass or more and 30% by mass or less, for example.

This is because if the content of the boride particles is 0.01% by mass or more, it is possible to obtain a boride particle dispersed liquid having sufficient infrared light shielding ability.

Furthermore, when the content of boride particles is 30% by mass or less, the viscosity of the boride particle dispersed liquid does not become excessively high and dispersion stability is maintained, which is preferable. In particular, the content of the boride particles in the boride particle dispersed liquid is more preferably 1% by mass or more and 30% by mass or less.

Furthermore, the boride particles in the boride particle dispersed liquid are preferably dispersed at an average dispersed particle diameter of 100 nm or less measured by a dynamic light scattering method, more preferably dispersed at 85 nm or less. This is because if the average dispersed particle diameter of the boride particles is 100 nm or less, the occurrence of blue haze in the infrared light shielding film produced by using the boride particle dispersed liquid according to the present embodiment, is suppressed, and the optical characteristics can be improved. Furthermore, when the average dispersed particle diameter is 85 nm or less, the occurrence of blue haze in the infrared light shielding film can be particularly suppressed.

Note that when the boride particle dispersed liquid is prepared by using the boride particles as described above, it is possible to efficiently pulverize the particles to an average dispersed particle diameter of 100 nm or less, particularly 85 nm or less, without causing problems such as gelation of the boride particle dispersed liquid (slurry), and the reason why this is possible is presumed as follows by the inventors of the present invention.

Boride particles are hard, and therefore abrasive debris, such as fine powder formed by abrasion of media beads or fine bead pieces formed as media beads are crushed, is mixed into the slurry when performing pulverization by using a wet medium stirring mill. At this time, as the carbon concentration increases, the hardness of the boride particles increases, so that when boride particles having a carbon concentration of more than 0.2% by mass are used as a raw material, a large amount of abrasive debris of the media beads gets mixed in the slurry. The inclusion of abrasive debris of such media beads causes an increase in the viscosity of the slurry.

The concentration ratio of abrasive debris of the media beads and boride in the slurry can be used as an index of the media bead abrasion amount. For example, when yttria-stabilized zirconia beads (also simply referred to as "zirconia beads") known to have high abrasion resistance, are used as the media beads, the concentration ratio Zr/X of the weight concentration (mass %) between Zr derived from zirconia beads and the metal element X in the boride represented by the general formula $XB_m$ in the slurry, can be used as an index of the abrasion amount of the media beads.

When the carbon concentration in the boride particles is higher than 0.2% by mass, the concentration ratio Zr/X between zirconia derived from zirconia beads and the metal element X in the boride represented by general formula $XB_m$ in the obtained slurry, becomes larger than 1.5. That is, the abrasion amount of the media beads becomes very large. The inclusion of abrasive debris of such media beads causes the increase in the viscosity of the slurry.

On the other hand, when boride particles having a carbon concentration of 0.2% by mass or less are used as a raw material, and yttria-stabilized zirconia beads are used as media beads, by pulverizing the particles until the average dispersed particle diameter is 100 nm or less, particularly 85 nm or less, the concentration ratio Zr/X in the obtained slurry can be reduced to 1.5 or less. That is, the inclusion amount of abrasive debris of the media beads greatly decreases, and therefore it is presumed that the pulverization can be efficiently performed without degrading the viscosity of the slurry. However, there are many unexplained points about the increase in the viscosity of the slurry, and there is a possibility that other functions are exerted, so the factor is not limited to the above function.

Note that when zirconia beads are used as the media beads and the dispersion treatment of the boride particle dispersed liquid is carried out, the concentration ratio Zr/X between Zr derived from zirconia beads and the metal element X in the boride represented by general formula $XB_m$ in the boride particle dispersed liquid is preferably the of 1.5 or less. That is, the boride particle dispersed liquid can include zirconia derived from media beads used at the time of pulverization, and the weight concentration of Zr is preferably less than or equal to 1.5 times the weight concentration of the metal element X in the boride particle dispersed liquid. This is because when the concentration ratio Zr/X in the boride particle dispersed liquid obtained as described above is 1.5 or less, the increase in viscosity of the boride particles can be sufficiently suppressed.

The boride particle dispersed liquid according to the present embodiment described above can be used as an infrared light shielding particle dispersed liquid for various applications. The boride particle dispersed liquid according to the present embodiment includes boride particles as described above, and the average dispersed particle diameter can easily be reduced to 100 nm or less, particularly 85 nm or less. Therefore, occurrence of blue haze can be suppressed.

(Infrared Light Shielding Transparent Base, Infrared Light Shielding Optical Member)

A configuration example of the infrared light shielding transparent base according to the present embodiment will be described.

The infrared light shielding transparent base according to the present embodiment has a coating layer on at least one side of the transparent base, and the coating layer can include infrared light shielding particles and a binder.

The infrared light shielding particles are represented by the general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula), and boride particles having a carbon amount of 0.2% by mass or less, as measured by a combustion-infrared absorption method, can be used.

As described above, the infrared light shielding transparent base according to the present embodiment can include a transparent base and a coating layer disposed on at least one side of the transparent base. The coating layer may include infrared light shielding particles and a binder.

Each component is described below.

(1) Infrared Light Shielding Particles and Producing Method Thereof

The above-mentioned boride particles can be used as the infrared light shielding particles, and therefore the description thereof will be omitted here.

(2) Binder

The coating layer can include a binder as described above, and therefore the binder will be described next.

As the binder, for example, an ultraviolet light (UV) curable resin, a thermoplastic resin, a thermosetting resin, an electron beam curable resin, and a room temperature curable resin, etc., may be selected according to the purpose. In particular, it is preferable that the binder includes at least one kind selected from an ultraviolet (UV) curing resin, a thermoplastic resin, a thermosetting resin, and a room temperature curing resin.

Specific examples of the binder include polyethylene resin, polyvinyl chloride resin, polyvinylidene chloride resin, polyvinyl alcohol resin, polystyrene resin, polypropylene resin, an ethylene vinyl acetate copolymer, polyester resin, polyethylene terephthalate resin, fluorine resin, polycarbonate resin, acrylic resin, polyvinyl butyral resin, etc.

As the binder, for example, one kind or a combination of two or more kinds selected from the above-described resin group, may be used. However, as the binder for the above-described coating layer, it is particularly preferable to use a UV curable resin from the viewpoints of productivity and equipment cost, among the above-described resin group.

Furthermore, instead of the resin-based binder as described above, an inorganic binder using a metal alkoxide may also be used. As the metal alkoxide, alkoxides such as Si, Ti, Al, Zr, etc., may be cited as representative materials. The inorganic binder using these metal alkoxides may form a coating layer of an oxide film by hydrolysis/polycondensation by heating, etc.

Furthermore, the resin-based binder described above and the inorganic binder described above may be mixed and used.

(3) Transparent Base

The infrared light shielding transparent base according to the present embodiment can have a coating layer on at least one side of the transparent base. Thus, a configuration example of the transparent base will be described below.

As the transparent base, for example, a transparent film base or a transparent glass base may be preferably used.

The transparent film base is not limited to a film shaped base, and may be, for example, board-like base or sheet-like base. The material of the transparent film base is not particularly limited, but one or more kinds selected from, for example, polyester, acrylic, urethane, polycarbonate, polyethylene, an ethylene vinyl acetate copolymer, vinyl chloride, fluororesin may be used. As the transparent film base, a polyester film is preferable, and a polyethylene terephthalate (PET) film is more preferable.

Furthermore, the transparent glass base is not particularly limited, and a transparent glass base such as silica glass and soda glass may be used.

Furthermore, the surface of the transparent base is preferably subjected to surface treatment in order to improve the coatability of the infrared light shielding particle dispersed liquid and the adhesion to the coating layer. Furthermore, in order to improve the adhesion between the transparent base and the coating layer, it is also possible to form an intermediate layer on the transparent base and form a coating layer on the intermediate layer. The constitution of the intermediate layer is not particularly limited, and the intermediate layer may be constituted by, for example, a polymer film, a metal layer, an inorganic layer (for example, an inorganic oxide layer such as silica, titania, zirconia, etc.), an organic/inorganic composite layer, etc.

As described above, the infrared light shielding transparent base according to the present embodiment has a coating layer on at least one side of a transparent base, and the coating layer may include infrared light shielding particles and a binder.

The coating layer may be configured only by the infrared light shielding particles and the binder; however, the coating layer may also include other components. For example, as described below, the coating layer may be produced by using an infrared light shielding particle dispersed liquid; a solvent, a dispersant, a coupling agent, a surface active agent, etc., may be added to the infrared light shielding particle dispersed liquid. Therefore, the coating layer may include an additive component added to the infrared light shielding particle dispersed liquid or a component derived from the additive component.

Furthermore, in order to further give an ultraviolet light shielding function to the infrared light shielding transparent base according to the present embodiment, at least one kind of a ultraviolet light shielding material selected from inorganic-based particles such as titanium oxide, zinc oxide, cerium oxide, etc., and organic-based particles such as benzophenone, benzotriazole, etc., may be added to the coating layer.

Note that the ultraviolet light shielding material is not limited to the form of being added to the coating layer, and a layer including an ultraviolet light shielding material may be separately formed. In the case of forming a layer including an ultraviolet light shielding material, the arrangement of the layer is not particularly limited; however, the layer may be formed on the coating layer, for example.

Furthermore, in order to improve the visible light transmittance of the infrared light shielding transparent base according to the present embodiment, one or more kinds of particles selected from ATO, ITO, aluminum-doped zinc oxide, and indium tin composite oxide, may be further mixed in the coating layer. By adding these transparent particles to the coating layer, the transmittance in the vicinity of a wavelength of 750 nm increases while the infrared light having a wavelength longer than 1200 nm is shielded, and therefore a heat ray shielding body having a high transmittance of near-infrared light and high heat ray shielding properties can be obtained. Note that, one or more kinds of particles selected from the above ATO, etc., are also not limited to the form of being added to the coating layer, and a layer including such particles may be formed separately from the coating layer.

The thickness of the coating layer on the transparent base is not particularly limited; however, in practice use, the thickness is preferably 20 μm or less, more preferably 6 μm or less. This is because when the thickness of the coating layer is 20 μm or less, sufficient pencil hardness is exerted to exhibit abrasion resistance, and in addition, when stripping the solvent in the coating layer and curing the binder, it is possible to avoid the occurrence of process abnormality such as warping of the substrate film.

Note that although the lower limit value of the thickness of the coating layer is not particularly limited, the thickness is preferably 10 nm or more, more preferably 50 nm or more, for example.

The content of the infrared light shielding particles included in the coating layer is not particularly limited; however, the content per projected area of the transparent base/coating layer is preferably 0.01 $g/m^2$ or more and 1.0 $g/m^2$ or less. This is because when the content is 0.01 $g/m^2$ or more, the heat ray shielding property can be significantly exhibited as compared with the case where the infrared light shielding particles are not included, and when the content is 1.0 $g/m^2$ or less, the infrared light shielding transparent base can sufficiently maintain visible light transmittance.

Furthermore, in the infrared light shielding transparent base according to the present embodiment, the peak intensity of the transmitted scattered light profile is preferably 1.5% or less in a wavelength region of 360 nm or more and 500 nm or less, in the case where the transmittance of visible light (wavelength of 400 nm or more and 780 nm or less) of the coating layer is set to 45% or more and 55% or less.

Note that when a transparent base having sufficient visible light transmittance is used and the transparent base has almost no influence on the visible light transmittance of the infrared light shielding transparent base, that is, when a transparent base having a visible light transmittance of 90% or more is used, for example, the visible light transmittance of the coating layer described above may be read as the visible light transmittance of the infrared light shielding transparent base.

Here, the method of evaluating blue haze will be described.

There is no known method for directly measuring blue haze. However, the applicant of the present invention has already proposed a method for evaluating "blue haze", by focusing attention on linear incident light and scattered light as components of transmitted light when light is applied to the infrared light shielding particle dispersed body, etc., which is a sample, and obtaining the intensity of transmitted scattered light for each wavelength (see Patent Literature 5). Hereinafter, the principle of measuring the intensity of transmitted scattered light of each wavelength, that is, the transmitted scattered light profile, will be described with reference to FIGS. 1 and 2.

First, a measuring apparatus for measuring a transmitted scattered light profile will be described with reference to FIGS. 1 and 2.

Figure 2:
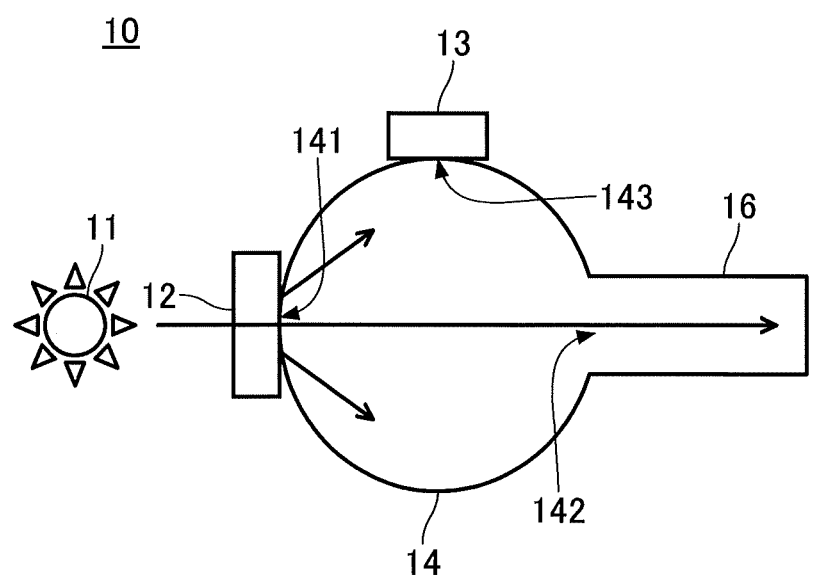
FIG. 2 is an explanatory diagram (part 2) illustrating a measurement principle of a transmitted scattered light profile of an infrared light shielding particle dispersed body, etc., according to an embodiment of the present invention.

As illustrated in FIGS. 1 and 2, a measuring apparatus 10 includes an integrating sphere 14. The integrating sphere 14 has diffusely reflecting properties in the inner surface of the spherical main body, and includes a first opening portion 141 and to which a measurement sample 12 (see FIG. 2) is attached, a second opening portion 142 to which a standard reflection plate 15 or a light trapping component 16 is attached, and a third opening portion 143 to which a light receiver 13 is attached.

Furthermore, the measuring apparatus 10 includes a light source 11 that emits linear light incident in the spherical space via the first opening portion 141, a spectroscope (not illustrated) that is attached to the light receiver 13 and that is configured to disperse the received reflected light or scattered light, a data storage means (not illustrated) that is connected to the spectroscope and that is configured to store spectroscopic data of the dispersed reflected light or scattered light, and a calculating means (not illustrated) configured to calculate the ratio of the transmitted scattered light intensity and the blank transmitted light intensity for each wavelength, from the stored pieces of spectral data of blank transmitted light intensity and transmitted scattered light intensity of each wavelength, to obtain the intensity of transmitted scattered light for each wavelength.

Here, the integrating sphere 14 has diffuse reflectivity as barium sulfate or SPECTRALON (registered trademark) etc., is applied to the inner surface of the spherical main body, and the incident angle to the standard reflection plate 15 is set, for example, at 10°, on the standard side and on the contrast side. Furthermore, as the light receiver 13, for example, a light receiver using a photomultiplier tube (ultraviolet/visible region) or a cooled lead sulfide (near-infrared region) can be used. Furthermore, as to the spectroscope (not illustrated) attached to the light receiver 13, a wavelength measurement range in the ultraviolet/visible region and photometric accuracy (±0.002 Abs) are required.

Next, as the light source 11 that emits linear light entering the spherical space, for example, a deuterium lamp can be applied for the ultraviolet region and a 50 W halogen lamp can be applied for the visible and near-infrared region.

Furthermore, as the standard reflection plate 15, for example, a white plate whose material is SPECTRALON can be used, and the light trapping component 16 needs to have a function of trapping incident linear light without reflecting the incident linear light, and therefore, for example, a dark box that almost completely absorbs incident linear light is used.

Then, the peak intensity of the transmitted scattered light profile of the infrared light shielding transparent base, etc., which is the measurement sample, is evaluated by using the measurement apparatus of the transmitted scattered light profile described above, by a blank transmitted light intensity measuring process, a transmitted scattered light intensity measuring process, and a process of calculating the intensity of transmitted scattered light.

First, in the blank transmitted light intensity measuring process, as illustrated in FIG. 1, the standard reflection plate 15 is attached to the second opening portion 142 of the integrating sphere 14, and in a state in which the measurement sample is not attached to the first opening portion 141, the linear light from the light source 11 is made to enter the spherical space via the first opening portion 141. Then, the reflected light reflected by the standard reflection plate 15 is received by the light receiver 13, the light is dispersed by the spectroscope (not illustrated) attached to the light receiver 13 to obtain spectroscopic data of reflected light. The spectroscopic data obtained here is the blank transmitted light intensity.

Next, in the transmitted scattered light intensity measuring process, as illustrated in FIG. 2, the light trapping component 16 is attached to the second opening portion 142 of the integrating sphere 14. Then, in a state where the measurement sample 12 is attached to the first opening portion 141, linear light from the light source 11 is made to enter the spherical space via the measurement sample 12 and the first opening portion 141, and scattered light other than the light trapped by the light trapping component 16 is received by the light receiver 13. At this time, the light is dispersed by the spectroscope (not illustrated) attached to the light receiver 13 to obtain spectroscopic data of the scattered light. The spectroscopic data obtained here is the transmitted scattered light intensity.

Then, in the process of calculating the intensity of transmitted scattered light, based on each piece of spectroscopic data of the blank transmitted light intensity and the transmitted scattered light intensity stored by the data storage means (not illustrated), the calculating means (not illustrated) can calculate the ratio of the transmitted scattered light intensity and the blank transmitted light intensity for each wavelength to obtain the intensity of transmitted scattered light for each wavelength, and can obtain the peak intensity in the wavelength region of 360 nm to 500 nm in the transmitted scattered light profile of the measurement sample 12, from the obtained intensity of transmitted scattered light of each wavelength.

Here, in the measuring apparatus for measuring the transmitted scattered light profile, an optical system for light beam adjustment may be provided between the light source 11 and the measurement sample 12. In this optical system, for example, a plurality of lenses are combined to adjust the parallel light, and the light amount is adjusted by the diaphragm. In some cases, cutting with a specific wavelength may be performed by a filter.

In the infrared light shielding transparent base according to the present embodiment, it is preferable that the peak intensity of the transmitted scattered light profile is preferably 1.5% or less in a wavelength region of 360 nm or more and 500 nm or less, in a case where the transmittance of visible light (a wavelength of 400 nm or more and 780 nm or less) of the coating layer is set to be 45% or more and 55% or less as described above. This is because it has been confirmed that in the infrared light shielding transparent base satisfying the above conditions, almost no blue haze is observed.

Note that the reason why the visible light transmittance of the coating layer is set to 45% or more and 55% or less, is to specify measurement conditions of the intensity of transmitted scattered light (transmitted scattered light profile), and the range is set because the intensity of transmitted scattered light is proportional to the visible light transmittance. Furthermore, the reason for measuring the intensity of transmitted scattered light (transmitted scattered light profile) in the wavelength region of 360 nm or more to 500 nm or less is that scattering in this region is the cause of blue haze. If the peak intensity of transmitted scattered light in the above range is 1.5% or less, blue haze is not observed experimentally by visual observation.

The infrared light shielding transparent base according to the present embodiment can be used for various optical members, for example, and an infrared light shielding optical member including the infrared light shielding transparent base according to the present embodiment can be made.

Examples of the infrared light shielding optical member referred to here include a window of a building, a window of an automobile, etc.

According to the infrared light shielding transparent base according to the present embodiment and the infrared light shielding optical member including the infrared light shielding transparent base described above, it is possible to obtain an infrared light shielding transparent base using boride particles that can be finely pulverized easily. Therefore, the average dispersed particle diameter of the infrared light shielding particles included in the coating layer can be made sufficiently small, and the occurrence of blue haze can be suppressed.

(Production Method of Infrared Light Shielding Transparent Base)

The infrared light shielding transparent base according to the present embodiment can be produced by using, for example, an infrared light shielding particle dispersed liquid. For this reason, first, an infrared light shielding particle dispersed liquid and a producing method thereof will be described.

(1) Infrared Light Shielding Particle Dispersed Liquid and Producing Method Thereof As described above, the infrared light shielding transparent base according to the present embodiment can be produced by using the infrared light shielding particle dispersed liquid including the boride particles that are the infrared light shielding particles described above. For this reason, one configuration example of the infrared light shielding particle dispersed liquid and the producing method thereof will be described here.

The infrared light shielding particle dispersed liquid is obtained by dispersing the above-described infrared light shielding particles in a solvent. The infrared light shielding particle dispersed liquid is obtained by adding the above-described infrared light shielding particles, that is, the boride particles, and optionally an appropriate amount of a dispersant, a coupling agent, a surface active agent, etc., to a solvent, and performing dispersion treatment, to disperse the infrared light shielding particles in the solvent.

The solvent of the infrared light shielding particle dispersed liquid is required to have the function of maintaining the dispersibility of the infrared light shielding particles and the function of not causing coating defects when applying the dispersed liquid.

Specifically, alcohol-based solvents such as methanol (MA), ethanol (EA), 1-propanol (NPA), isopropanol (IPA), butanol, pentanol, benzyl alcohol, and diacetone alcohol, etc., ketone-based solvents such as acetone, methyl ethyl ketone (MEK), methyl ethyl ketone, methyl propyl ketone, methyl isobutyl ketone (MIBK), cyclohexanone, isophorone, etc., ester-based solvents such as 3-methyl-methoxy-propionate (MMP), etc., glycol derivatives such as ethylene glycol monomethyl ether (MCS), ethylene glycol monoethyl ether (ECS), ethylene glycol isopropyl ether (IPC), propylene glycol methyl ether (PGM), propylene glycol ethyl ether (PE), propylene glycol methyl ether acetate (PGMEA), propylene glycol ethyl ether acetate (PE-AC), etc., amides such as formamide (FA), N-methylformamide, dithethylformamide (DMF), dimethylacetamide, N-methyl-2-pyrrolidone (NMP), etc., aromatic hydrocarbons such as toluene and xylene, etc., halogenated hydrocarbons such as ethylene chloride, chlorobenzene, etc., can be cited, and one kind or a combination of two or more kinds selected from the above may be used.

Among the above-mentioned solvents, those having a high hydrophobicity, particularly ketones such as MIBK and MEK, aromatic hydrocarbons such as toluene and xylene, glycol ether acetates such as PGMEA and PE-AC, etc., are more preferable. Therefore, it is more preferable to use one kind or a combination of two or more kinds selected from these.

Furthermore, in order to form a coating layer on a transparent base such as a transparent film base or a transparent glass base, it is preferable to select an organic solvent having a low boiling point as the solvent. This is because if the solvent is an organic solvent having a low boiling point, the solvent can be easily removed in the drying process after coating, and the properties of the coating layer, such as hardness and transparency, are not impaired.

Specifically, it is preferable to use one kind or a combination of two or more kinds selected from ketones such as methyl isobutyl ketone, methyl ethyl ketone, etc., and aromatic hydrocarbons such as toluene, xylene, etc.

The dispersant, the coupling agent, and the surface active agent can be selected depending to the application; however, the selected agent preferably includes a group including an amine, a hydroxyl group, a carboxyl group, or an epoxy group, as the functional group. These functional groups are adsorbed on the surfaces of the infrared light shielding particles to prevent aggregation of the infrared light shielding particles, thereby exerting the effects of uniformly dispersing the infrared light shielding particles in the coating layer or in the infrared light shielding particle dispersed body, when a coating layer is formed on the transparent base or when an infrared light shielding particle dispersed body described below, etc., is formed on the transparent base.

As the dispersant, the coupling agent, and the surface active agent, a phosphate compound, a polymeric dispersant, a silane-based coupling agent, a titanate-based coupling agent, an aluminum-based coupling agent, etc., may be suitably used.

Note that examples of the polymeric dispersant include an acrylic-based polymeric dispersant, a urethane-based polymeric dispersant, an acrylic block copolymer-based polymeric dispersant, a polyether-based dispersant, and a polyester-based polymeric dispersant.

However, the dispersant, the coupling agent, and the surface active agent are not limited to the above, and various dispersants, coupling agents, and surface active agents may be used.

The addition amount of one or more kinds of materials selected from the dispersant, the coupling agent, and the surface active agent to the infrared light shielding particle dispersed liquid is preferably in a range of 10 parts by weight or more and 1000 parts by weight or less, and more preferably in a range of 20 parts by weight or more and 200 parts by weight or less, with respect to 100 parts by weight of the boride particles, which are the infrared light shielding particles.

When the addition amount of the dispersant, etc., is within the above range, the infrared light shielding particles do not aggregate in the dispersed liquid and the dispersion stability is maintained.

A method of dispersing boride particles, which are infrared light shielding particles, in a solvent (liquid medium), is not particularly limited. For example, a method in which a raw material mixture of the infrared light shielding particle dispersed liquid is subjected to dispersion treatment using a wet medium mill such as a bead mill, a ball mill, a sand mill, etc., may be cited. In particular, the infrared light shielding particle dispersed liquid according to the present embodiment is preferably in a state in which infrared light shielding particles having an average dispersed particle diameter of 100 nm or less are dispersed in a solvent (liquid medium), and the average dispersed particle diameter of the infrared light shielding particles is more preferably 85 nm or less. Therefore, it is preferable to prepare a dispersed liquid by dispersing the boride particles by a wet pulverizing method using a medium stirring mill such as a bead mill.

In order to obtain a uniform infrared light shielding particle dispersed liquid, various additives and dispersants may be added or the pH may be adjusted.

The content of the infrared light shielding particles in the above-described infrared light shielding particle dispersed liquid is preferably 0.01% by mass or more and 30% by mass or less. This is because when the content of the infrared light shielding particles is 0.01% by mass or more, a coating layer having an infrared light shielding ability can be formed on the transparent base. Furthermore, if the content of the infrared light shielding particles is 30% by mass or less, the infrared light shielding dispersed liquid can be easily applied on the transparent base, and the productivity of the coating layer can be enhanced.

Furthermore, the infrared light shielding particles in the infrared light shielding particle dispersed liquid are preferably dispersed at an average dispersed particle diameter of 100 nm or less, more preferably dispersed at 85 nm or less. When the average dispersed particle diameter of the infrared light shielding particles is 100 nm or less, the occurrence of blue haze in the infrared light shielding transparent base produced using the infrared light shielding particle dispersed liquid according to the present embodiment is suppressed, and the optical characteristics can be improved. Furthermore, when the average dispersed particle diameter is 85 nm or less, the occurrence of blue haze in the infrared light shielding transparent base can be particularly suppressed.

Note that when the infrared light shielding particle dispersed liquid is prepared using the above-described boride particles, the particles can be efficiently pulverized to an average dispersed particle diameter of 100 nm or less, particularly 85 nm or less, without problems such as gelation of the infrared light shielding particle dispersed liquid (slurry), and the reason for this been presumed as follows by the inventors of the present invention.

Boride particles are hard, and therefore abrasive debris such as fine powder created when media beads are abraded or fine bead pieces created when media beads are crushed, gets mixed into the slurry, when performing pulverization by using a wet medium stirring mill. In this case, as the carbon concentration increases, the hardness of the boride particles increases, and therefore when boride particles having a carbon concentration of more than 0.2% by mass are used as the raw material, a large amount of abrasive debris of the media beads gets mixed in the slurry. The inclusion of abrasive debris of such media beads causes the viscosity of the slurry to increase.

On the other hand, when boride particles having a carbon concentration of 0.2% by mass or less are used as the raw material, when pulverizing the particles to have an average dispersed particle diameter of 100 nm or less, particularly 85 nm or less, the contamination amount of abrasive debris of media beads is greatly reduced, and therefore it is presumed that pulverization can be efficiently performed without degrading the viscosity of the slurry. However, there are many unexplained points about the increase in the viscosity of the slurry, and there is a possibility that other functions are exerted, so the factor is not limited to the above function.

(2) Method of Producing Infrared Light Shielding Transparent Base

Next, a configuration example of the method of producing the infrared light shielding transparent base according to the present embodiment will be described.

The infrared light shielding transparent base according to the present embodiment can be produced by forming a coating layer including infrared light shielding particles on a transparent base, by using the infrared light shielding particle dispersed liquid described above. An example of specific procedures will be described below.

A binder is added to the above-described infrared light shielding particle dispersed liquid to obtain a coating liquid.

After coating the surface of the transparent base with the obtained coating liquid, the solvent is evaporated and the binder is cured by a predetermined method, whereby a coating layer, in which the infrared light shielding particles are dispersed in the medium, can be formed.

Furthermore, it is also possible to prepare a coating liquid in which the concentration is adjusted, without adding a binder to the infrared light shielding particle dispersed liquid, apply the coating liquid on the transparent base, evaporate the solvent, and then overcoat the applied coating liquid with a coating liquid including a binder, evaporate the solvent, thereby forming the coating layer.

The binder and the transparent base that can be suitably used for the coating layer have already been described above, and therefore descriptions thereof will be omitted here.

Note that the surface of the transparent base is preferably subjected to a surface treatment in order to improve coatability of the infrared light shielding particle dispersed liquid and adhesion to the coating layer. Furthermore, in order to improve the adhesion between the transparent base and the coating layer, it is also possible to form an intermediate layer on the transparent base and form the coating layer on the intermediate layer. The constitution of the intermediate layer is not particularly limited, and the intermediate layer may be constituted by, for example, a polymer film, a metal layer, an inorganic layer (for example, an inorganic oxide layer of silica, titania, zirconia, etc.), an organic/inorganic composite layer, etc.

The method of providing the coating layer on the transparent base is not particularly limited as long as the infrared light shielding particle dispersed liquid uniformly coats the surface of the transparent base. For example, a bar coating method, a gravure coating method, a spray coating method, a dip coating method, etc., may be cited.

For example, in the case where UV curable resin is used as a binder included in the infrared light shielding particles and a coating layer is formed by a bar coating method, the liquid concentration and additives are preferably appropriately adjusted so that the infrared light shielding particle dispersed liquid has appropriate leveling properties. Then, a wire bar having a bar number is selected such that the thickness of the coating layer and the content of the infrared light shielding particles can achieve the purpose of the resulting infrared light shielding transparent base, and a coating film can be formed on the transparent base.

Subsequently, after the organic solvent included in the coating film is removed by drying, the coating film is irradiated with ultraviolet light and cured, to form a coating layer on the transparent base. In this case, the drying conditions of the coating film are different depending on each component, the solvent type, and the usage ratio; however, heating may be carried out at a temperature of 60° C. to 140° C. for approximately 20 seconds to 10 minutes, for example. There is no particular limitation on the method of irradiating ultraviolet light, and a UV exposure machine such as an extra-high pressure mercury lamp may be suitably used, for example.

Furthermore, it is possible to adjust the adhesion between the transparent base and the coating layer, the smoothness of the coating film at the time of coating, the drying properties of the organic solvent, etc., by the processes before and after the formation of the coating layer. Examples of the processes before and after the formation include a surface treatment process on the transparent base, a pre-baking (pre-heating of the base) process, a post-baking (post-heating of the base) process, etc., and may be appropriately selected. The heating temperature in the pre-baking process and/or the post-baking process is preferably 80° C. or more and 200° C. or less, and the heating time is preferably 30 seconds or more and 240 seconds or less.

The thickness of the coating layer to be formed and the preferable range of the content of the infrared light shielding particles in the coating layer have already been described above, and therefore descriptions thereof are omitted here.

Note that in order to further give an ultraviolet light shielding function to the infrared light shielding transparent base according to the present embodiment, one or more kinds of particles selected from inorganic-based particles such as titanium oxide, zinc oxide, cerium oxide, etc., and organic-based particles such as benzophenone, benzotriazole, etc., may be added to the coating layer.

Furthermore, in order to improve the visible light transmittance of the infrared light shielding transparent base according to the present embodiment, one or more kinds of particles selected from ATO, ITO, aluminum-doped zinc oxide, and indium tin composite oxide, may be further mixed in the coating layer. By adding these transparent particles to the coating layer, the transmittance in the vicinity of the wavelength of 750 nm increases, while infrared light having a wavelength longer than 1200 nm is shielded, and therefore a heat ray shielding body having high transmittance of the near-infrared light and high heat ray shielding properties, can be obtained.

According to the method of producing the infrared light shielding transparent base according to the present embodiment described above, it is possible to produce an infrared light shielding transparent base by using boride particles that can be finely pulverized easily. According to such an infrared light shielding transparent base, the average dispersed particle diameter of the infrared light shielding particles included in the coating layer can be made sufficiently small, and the occurrence of blue haze can be suppressed.

(Infrared Light Shielding Particle Dispersed Body)

One configuration example of the infrared light shielding particle dispersed body according to the present embodiment will be described.

The infrared light shielding particle dispersed body according to the present embodiment may include boride particles and a thermoplastic resin. Here, the boride particles are represented by the general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula), and the amount of carbon can be reduced to 0.2% by mass or less, as measured by a combustion-infrared absorption method.

Each component will be described below.

(1) Boride Particles (Infrared Light Shielding Particles) and Producing Method Thereof The above-described boride particles can be used, and therefore descriptions thereof are omitted here.

(2) Thermoplastic Resin

As described above, the infrared light shielding particle dispersed body according to the present embodiment may include a thermoplastic resin. The thermoplastic resin is not particularly limited, and various thermoplastic resins can be used depending on the application, etc.

For example, when applying the infrared light shielding particle dispersed body according to the present embodiment to various kinds of window materials, it is preferable that the thermoplastic resin has sufficient transparency.

Specifically, as the thermoplastic resin, it is preferable to use one or more kinds selected from one kind of resin selected from the following resin group, a mixture of two or more kinds of resin selected from the following resin group, or a copolymer including two or more kinds of resin selected from the following resin group; the resin group including polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl acetate copolymer, ionomer resin, polyvinyl butyral resin, and polyvinyl acetal resin.

Furthermore, for example, when the infrared light shielding particle dispersed body according to the present embodiment is directly used as a board-shaped window material, the thermoplastic resin preferably has high transparency and general properties required as a window material, that is, rigidity, light weight, long-term durability, low cost, etc. In this case, the thermoplastic resin is preferably one or more kinds of resin selected from, for example, polyethylene terephthalate resin, polycarbonate resin, ionomer resin, and acrylic resin, and is more preferably polycarbonate resin.

On the other hand, in the case where the infrared light shielding particle dispersed body according to the present embodiment is used as an intermediate layer of an infrared light shielding laminated transparent base described later, from the viewpoints of adhesion to the transparent base, weather resistance, penetration resistance etc., as the thermoplastic resin, polyvinyl acetal resin, or an ethylene-vinyl acetate copolymer can be preferably used. Particularly, in this case, the thermoplastic resin is more preferably polyvinyl butyral resin.

Furthermore, in the case where the infrared light shielding particle dispersed body according to the present embodiment is used as an intermediate layer, and the thermoplastic resin constituting the infrared light shielding particle dispersed body alone does not have sufficient flexibility or sufficient adhesion to the transparent base, for example, when the thermoplastic resin is polyvinyl acetal resin, it is preferable to add a plasticizer.

The plasticizer is not particularly limited, and a substance, which functions as a plasticizer for the thermoplastic resin to be used, can be used. For example, as a plasticizer to be used for polyvinyl acetal resin, a plasticizer that is a compound of monohydric alcohol and organic acid ester, an ester-based plasticizer such as a polyhydric alcohol organic acid ester compound, and a phosphoric acid-based plasticizer such as an organic phosphoric acid plasticizer, etc., may be cited. Any of the plasticizers are preferably liquid at room temperature. Among these, a plasticizer that is an ester compound synthesized from polyhydric alcohol and fatty acid is preferable.

As described above, the infrared light shielding particle dispersed body according to the present embodiment may include boride particles and thermoplastic resin. For example, the infrared light shielding particle dispersed body may have a form in which the boride particles described above are dispersed in thermoplastic resin.

Note that the infrared light shielding particle dispersed body according to the present embodiment may include any component other than boride particles and thermoplastic resin, according to need. For example, as described above, the infrared light shielding particle dispersed body may also include a plasticizer, any additive component to be added in the process of producing the infrared light shielding particle dispersed body, and a component derived from the additive component.

Furthermore, in order to further give a ultraviolet light shielding ability to the infrared light shielding particle dispersed body according to the present embodiment, it is possible to add at one or more kinds of particles selected from inorganic-based particles such as titanium oxide, zinc oxide, cerium oxide, etc., and organic-based particles such as benzophenone, benzotriazole, etc., to the infrared light shielding particle dispersed body.

Furthermore, in order to improve the visible light transmittance of the infrared light shielding particle dispersed body according to the present embodiment, one or more kinds of particles selected from ATO, ITO, aluminum-doped zinc oxide, and indium tin composite oxide, may be further mixed in the infrared light shielding particle dispersed body. By adding these transparent particles to the infrared light shielding particle dispersed body, the transmittance in the vicinity of a wavelength of 750 nm increases while the infrared light having a wavelength longer than 1200 nm is shielded, and therefore an infrared light shielding particle dispersed body having a high transmittance of near-infrared light and high heat ray shielding properties can be obtained.

The content of the boride particles that are the infrared light shielding particles included in the infrared light shielding particle dispersed body is not particularly limited; however, the content of the boride particles per unit projected area is preferably 0.01 $g/m^2$ or more and 1.0 $g/m^2$ or less. This is because when the content is 0.01 $g/m^2$ or more, the heat ray shielding property can be exhibited significantly, as compared with the case where the boride particles that are the infrared light shielding particles are not included, and when the content is 1.0 g/m² or less, the infrared light shielding particle dispersed body can sufficiently maintain the transmittance of visible light.

Although the optical characteristics of the infrared light shielding particle dispersed body according to the present embodiment are not particularly limited, when the maximum transmittance in the visible light wavelength region is 70%, the transmittance in the near-infrared light having a wavelength of 850 nm, is preferably 23% or more and 45% or less, and the minimum value of the transmittance of a heat ray having a wavelength of 1200 nm or more and 1800 nm or less, is preferably 15% or less.

Here, as a method for adjusting the maximum transmittance in the visible light wavelength region to 70%, a method of adjusting the content of the boride particles, which are infrared light shielding particles, of the infrared light shielding particle dispersed body, and adjusting the thickness of the infrared light shielding particle dispersed body, etc., may be cited.

Specifically, the method can be easily performed by adjusting the concentration of the infrared light shielding particles included in an infrared light shielding particle dispersed powder to be described later, the infrared light shielding particle plasticizer dispersed liquid, or the master batch, adjusting the addition amount of the infrared light shielding particle dispersed powder, the infrared light shielding particle plasticizer dispersed liquid, or the master batch at the time of preparing a resin composition, and adjusting the film thickness, etc., of the film or the sheet.

The shape of the infrared light shielding particle dispersed body according to the present embodiment is not particularly limited; however, the infrared light shielding particle dispersed body may have, for example, a plate shape; specifically, a sheet shape, a board shape, or a film shape. Note that the infrared light shielding particle dispersed body according to the present embodiment may also be referred to as an infrared light shielding film, an infrared light shielding sheet, etc., depending on the shape.

Furthermore, in the infrared light shielding particle dispersed body according to the present embodiment, it is preferable that the peak intensity of the transmitted scattered light profile is 1.5% or less in a wavelength region of 360 nm or more to 500 nm or less, when the transmittance of visible light (wavelength of 400 nm or more and 780 nm or less) is set to 45% or more and 55% or less.

The evaluation method of blue haze has already been described, and therefore descriptions therefor are omitted here. Note that although it is not known how to directly measure blue haze as described above, the applicant of the present invention has focused attention on linear incident light and scattered light, as components of transmitted light when light is applied to an infrared light shielding particle dispersed body that is the sample, and has already proposed a method of evaluating "blue haze" by obtaining the intensity of transmitted scattered light for each wavelength, as described in the present specification.

In the infrared light shielding particle dispersed body according to the present embodiment, as described above, it is preferable that the peak intensity of the transmitted scattered light profile is 1.5% or less in a wavelength region of 360 nm or more to 500 nm or less, when the transmittance of visible light (wavelength of 400 nm or more and 780 nm or less) of the infrared light shielding particle dispersed body is set to 45% or more and 55% or less. This is because it has been confirmed that almost no blue haze is observed in an infrared light shielding particle dispersed body satisfying the above conditions.

Note that the reason why the visible light transmittance of the infrared light shielding particle dispersed body is set to 45% or more and 55% or less, is to specify measurement conditions of intensity of transmitted scattered light (transmitted scattered light profile), and the range is set because the intensity of transmitted scattered light is proportional to the visible light transmittance. Furthermore, the reason for measuring the intensity of transmitted scattered light (transmitted scattered light profile) in the wavelength region of 360 nm or more to 500 nm or less is that scattering in this region is the cause of blue haze. If the peak intensity of transmitted scattered light in the above range is 1.5% or less, blue haze is not observed experimentally by visual observation.

According to the infrared light shielding particle dispersed body according to the present embodiment described above, it is possible to obtain an infrared light shielding particle dispersed body using boride particles that can be easily pulverized. Therefore, it is possible to sufficiently reduce the average dispersed particle diameter of the boride particles that are the infrared light shielding particles, thereby suppressing the occurrence of blue haze.

(Method of Producing Infrared Light Shielding Particle Dispersed Powder, Master Batch, nd Infrared Light Shielding Particle Dispersed Body)

(1) Infrared Light Shielding Particle Dispersed Liquid and Producing Method Thereof The infrared light shielding particle dispersed body according to the present embodiment can be produced by using the infrared light shielding particle dispersed liquid including the boride particles described above as infrared light shielding particles. For this reason, one configuration example of the infrared light shielding particle dispersed liquid and the producing method thereof will be described here.

The infrared light shielding particle dispersed liquid is prepared by dispersing the above-described boride particles in a solvent. The infrared light shielding particle dispersed liquid is prepared by adding the above-described boride particles, which are infrared light shielding particles, and optionally an appropriate amount of a dispersant, a coupling agent, and a surface active agent, etc., to a solvent, and performing dispersion treatment to disperse the boride particles in the solvent.

The same infrared light shielding particle dispersed liquid as described in the method for producing the infrared light shielding transparent base can be used, and therefore descriptions thereof will be omitted here.

The content of boride particles, which are infrared light shielding particles in the infrared light shielding particle dispersed liquid, is preferably 0.01% by mass or more and 30% by mass or less. This is because when the content of the infrared light shielding particles is 0.01% by mass or more, an infrared light shielding particle dispersed body having sufficient infrared light shielding ability can be formed. Furthermore, if the content of the infrared light shielding particles is 30% by mass or less, the infrared light shielding particle dispersed body can be easily molded and the productivity of the infrared light shielding particle dispersed body can be enhanced.

Furthermore, the boride particles that are the infrared light shielding particles in the infrared light shielding particle dispersed liquid are preferably dispersed at an average dispersed particle diameter of 100 nm or less, more preferably be dispersed at 85 nm or less. When the average dispersed particle diameter of the infrared light shielding particles is 100 nm or less, the occurrence of blue haze in the infrared light shielding particle dispersed body produced using the infrared light shielding particle dispersed liquid according to the present embodiment is suppressed, and the optical characteristics can be improved. Furthermore, when the average dispersed particle diameter is 85 nm or less, the occurrence of blue haze in the infrared light shielding particle dispersed body can be particularly suppressed.

(2) Infrared Light Shielding Particle Dispersed Powder, Infrared Light Shielding Particle Plasticizer Dispersed Liquid, Master Batch, and Producing Method Thereof As described above, boride particles that are infrared light shielding particles can be dispersed in a solvent, optionally together with a dispersant, and coupling agent and/or a surface active agent, to obtain an infrared light shielding particle dispersed liquid.

Then, by removing the solvent from the infrared light shielding particle dispersed liquid, it is possible to obtain the infrared light shielding particle dispersed powder according to the present embodiment in which the infrared light shielding particles are dispersed, for example, in a dispersant.

In this case, the infrared light shielding particle dispersed powder is represented by the general formula XB. (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula), and the infrared light shielding particle dispersed powder may include boride particles, in which the amount of carbon is 0.2% by mass or less as measured by a combustion-infrared absorption method, and a dispersant.

As a method for removing the solvent from the infrared light shielding particle dispersed liquid, it is preferable to dry the infrared light shielding particle dispersed liquid under reduced pressure. Specifically, the infrared light shielding particle dispersed liquid is dried while being stirred under reduced pressure, such that the composition including infrared light shielding particles and the solvent components are separated. As a device used for the drying under reduced pressure, there is a vacuum stirring type dryer; however, the device is not particularly limited as long as the device has the above functions. Furthermore, the pressure value at the time of depressurization in the drying process is appropriately selected.

By using the above method of drying under reduced pressure, the efficiency of removing the solvent from the infrared light shielding particle dispersed liquid is improved, and at the same time, the infrared light shielding particle dispersed powder according to the present embodiment is not exposed to high temperature for a long time, and therefore aggregation of the infrared light shielding particles dispersed in the dispersed powder or the plasticizer dispersed liquid does not occur, which is preferable. Furthermore, the productivity of the infrared light shielding particle dispersed powder, etc., is increased, and it is easy to recover the evaporated solvent, which is preferable from the viewpoint of environmental considerations.

In the infrared light shielding particle dispersed powder according to the present embodiment obtained after the drying process, the residual organic solvent is preferably 5% by mass or less. When the residual organic solvent is 5% by mass or less, bubbles are not generated when the infrared light shielding particle dispersed powder is processed into an infrared light shielding laminated transparent base, etc., and the appearance and optical characteristics are favorably maintained.

Furthermore, an infrared light shielding particle plasticizer dispersed liquid may be obtained by dispersing the infrared light shielding particles in a plasticizer together with a dispersant, a coupling agent and/or a surface active agent.

Note that the method of producing the infrared light shielding particle plasticizer dispersed liquid is not limited to the above-described method, but the infrared light shielding particle plasticizer dispersed liquid may also be obtained by adding a plasticizer to an infrared light shielding particle dispersed liquid and removing the solvent. The removal of the solvent is preferably carried out by drying under reduced pressure as in the process of preparing the infrared light shielding particle dispersed powder.

The infrared light shielding particle plasticizer dispersed liquid is represented by the general formula $XB_m$ (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula), and the infrared light shielding particle plasticizer dispersed liquid may include boride particles, in which the amount of carbon is 0.2% by mass or less as measured by a combustion-infrared absorption method, and a plasticizer.

Furthermore, by dispersing the boride particles or the dispersed powder in resin and pelletizing the resin, the master batch according to the present embodiment can be obtained.

Furthermore, the master batch may be obtained by a method in which the boride particles and the infrared light shielding particle dispersed powder, a powder and granular material or the pellets of the thermoplastic resin, and other additives according to need, are mixed uniformly, and then the mixture is kneaded with a vented single or twin screw extruder, and then the mixture is processed into a pellet shape by cutting the strand that is melted and extruded once.

The shape of the master batch is not particularly limited; however, for example, the master batch may have a columnar shape or a prismatic shape. It is also possible to adopt a so-called hot cut method in which the melted and extruded material is directly cut. In this case, the master batch is generally a spherical shape.

Note that the master batch according to the present embodiment is an infrared light shielding particle dispersed body represented by the general formula XB. (where X is at least one kind of metal element selected from Y, La, Ce, Pr, Nd, Sm, Eu, Gd, Tb, Dy, Ho, Er, Tm, Yb, Lu, Sr, Ca, and m is a number indicating the amount of boron in the general formula), and the master batch may include boride particles, in which the amount of carbon is 0.2% by mass or less as measured by a combustion-infrared absorption method, and thermoplastic resin, and may have a pellet shape.

(3) Method of Producing Infrared Light Shielding Particle Dispersed Body

By uniformly mixing the infrared light shielding particle dispersed powder, the infrared light shielding particle plasticizer dispersed liquid, or the master batch according to the present embodiment described above into thermoplastic resin that is a transparent resin, the infrared light shielding particle dispersed body according to the present embodiment can be produced.

According to the infrared light shielding particle dispersed body according to the present embodiment, for example, while ensuring the infrared light shielding properties of a composite tungsten oxide according to the conventional technology, the transmittance of near-infrared light in the wavelength region of 700 nm or more to 1200 nm or less is improved.

The thermoplastic resin that can be suitably used for the infrared light shielding particle dispersed body according to the present embodiment has already been described above, and therefore descriptions thereof will be omitted here.

Then, after kneading the dispersed powder or the plasticizer dispersed liquid or the master batch, the thermoplastic resin, and optionally a plasticizer and other additives, the kneaded product is formed, for example, into a planar or curved sheet material, by a known method such as an extrusion molding method, injection molding method, etc., thereby producing the infrared light shielding particle dispersed body.

As a method of forming the infrared light shielding particle dispersed body, a known method may be used. For example, a calendar roll method, an extrusion method, a casting method, an inflation method, etc., may be used.

(Infrared Light Shielding Laminated Transparent Base)

The infrared light shielding laminated transparent base according to the present embodiment may include a plurality of transparent bases and the above-described infrared light shielding particle dispersed body. Also, the infrared light shielding particle dispersed body may be arranged between a plurality of transparent bases.

The infrared light shielding laminated transparent base is obtained by sandwiching an infrared light shielding particle dispersed body, which is an intermediate layer, from both sides thereof, with transparent bases.

As the transparent base, plate glass that is transparent in the visible light region, plate-shaped plastic, film-like plastic, etc., is used. That is, a transparent glass base or a transparent plastic base may be used.

The material of the plastic is not particularly limited and may be selected according to the application; however, when the transparent base is used for transportation equipment such as an automobile, from the viewpoint of ensuring the transparency of the driver and the passenger of the transportation equipment, transparent resins such as polycarbonate resin, acrylic resin, and polyethylene terephthalate resin are preferable. Furthermore, polyamide resin, vinyl chloride resin, olefin resin, epoxy resin, polyimide resin, fluororesin, etc., may be used.

Note that in the infrared light shielding laminated transparent base according to the present embodiment, the peak intensity of the transmitted scattered light profile is preferably 1.5% or less in a wavelength region of 360 nm or more and 500 nm or less, in the case where the transmittance of visible light (wavelength of 400 nm or more and 780 nm or less) of the infrared light shielding particle dispersed body is set to 45% or more and 55% or less. This is because blue haze can be more reliably suppressed when the peak intensity of the transmitted scattered light profile is within the above range.

The infrared light shielding laminated transparent base according to the present embodiment can also be obtained by laminating and integrating a plurality of inorganic glass sheets opposed to each other with the above-described infrared light shielding particle dispersed body sandwiched therebetween, by a known method. The resultant infrared light shielding laminated inorganic glass can be preferably used mainly as inorganic glass for the windshield of an automobile or as a window of a building.

PRACTICAL EXAMPLES

Hereinafter, the present invention will be described more specifically with reference to practical examples. However, the present invention is not limited to the following practical examples.

First, the methods of evaluating the samples in the following practical examples and comparative examples will be described.

(Composition of Boride Particles)

The boride particles obtained in the following practical examples and comparative examples were analyzed by using ICP (model: ICPE 9000, manufactured by Shimadzu Corporation), to calculate the element ratio (molar ratio) of boron (B) to the metal element X when represented by the general formula $XB_m$, that is, the value of m that is the element ratio (B/X) of boron (B) and the metal element (X) in the in the boride particles.

(Carbon Concentration in Boride Particles)

The amount of carbon (carbon concentration) in the boride particles prepared in each of the following practical examples and comparative examples, was measured by a combustion-infrared absorption method.

($B_4C$ Concentration in Boride Particles)

Among the obtained boride particles, the sample for measuring the $B_4C$ concentration was divided into two samples, each sample was weighed in a platinum crucible, 7N nitric acid was added to each sample, and each sample was heated to 50° C., to dissolve the boride particles. After cooling each sample, pure water was added to each sample, and the undissolved residue ($B_4C$) was separated by filtration using a cellulose acetate membrane filter having a pore size of 0.2 µm.

The undissolved residue thus obtained of one of the samples was placed in the original platinum crucible, and was wet with a saturated aqueous solution of calcium hydroxide to prevent the volatilization of boron, and was then dried in a dryer at approximately 80° C. After the drying, sodium carbonate was added to the sample and the sample was thoroughly mixed, followed by heating and melting the sample. After cooling down the sample, the molten salt in the crucible was dissolved with warm water and transferred to a Teflon (registered trademark) beaker. After adding nitric acid to the sample, heating and boiling were carried out to remove carbon dioxide gas, thus obtaining a sample solution for ICP. The boron concentration in the obtained sample solution was analyzed by ICP.

Furthermore, the undissolved residue thus obtained of the other one of the samples was subjected to XRD measurement, and it was confirmed whether the undissolved residue was a $B_4C$ single phase. In the case of being a $B_4C$ single phase, the $B_4C$ concentration was calculated from the boron concentration analyzed by ICP.

(Average Dispersed Particle Diameter)

The average dispersed particle diameter of the boride particles in the infrared light shielding particle dispersed liquid (boride particle dispersed liquid) prepared in the following practical examples and comparative examples was measured by a particle diameter measuring device (model: ELS-8000, manufactured by Otsuka Electronics Co., Ltd.) based on a dynamic light scattering method. The particle refractive index was 1.81, and the particle shape was aspherical. The background was measured with toluene and the solvent refractive index was 1.50.

(Weight Concentration Ratio (Zr/X) of Zr and Metal Element X in Boride Particle Dispersed Liquid)

The weight concentration ratio (Zr/X) of Zr and the metal element X in the boride particle dispersed liquid was measured by ICP (model: ICPE 9000, manufactured by Shimadzu Corporation) and calculated from the measured value.

(Visible Light Transmittance)

The visible light transmittance in the following practical examples and comparative examples is the ratio of the transmission luminous flux with respect to the incident luminous flux, of the luminous flux of daylight vertically incident on the sample. Here, the daylight means the CIE daylight determined by the International Commission on Illumination. In this CIE daylight, the spectral illuminance distribution of daylight at the same color temperature as that of blackbody radiation, is indicated as a relative value with respect to the value of wavelength 560 nm, based on observation data. Furthermore, the above luminous flux is obtained by integrating the numerical value of the product of the radiant flux for each wavelength of radiation and the luminosity factor (sensitivity human of eyes to light) with respect to the wavelength. That is, the visible light transmittance is a value indicating the brightness perceived by the human eyes as an integrated value of the transmitted light amount obtained by standardizing the light transmission amount in the wavelength region of 380 nm or more to 780 nm or less with the luminosity factor of human eyes.

With respect to the measurement of visible light transmittance, a spectrophotometer (model: U-4100, manufactured by Hitachi, Ltd.) was used to measure the visible light transmittance at intervals of 1 nm in the wavelength range of 300 nm or more to 2600 nm or less, with respect to the infrared light shielding particle dispersed body or the infrared light shielding laminated transparent base prepared in the following practical examples and comparative examples.

(Peak Intensity of Transmitted Scattered Light Profile)

The boride particle dispersed liquid prepared in the following practical examples and comparative examples was adjusted so that the transmittance of visible light (wavelength of 400 nm or more to 780 nm or less) was 50%, and a spectrophotometer (model: U-4100, manufactured by Hitachi, Ltd.) was used as a spectroscope to measure the peak intensity of the transmitted scattered light profile in the wavelength region of 360 nm or more to 500 nm or less by the methods described with reference to FIGS. 1 and 2.

As the measurement sample, the boride particle dispersed liquid prepared in each of the practical examples and comparative examples was diluted with a main solvent so as to have the above-described visible light transmittance, and was placed in a 10 mm square glass cell for measurement.

It has been confirmed that when the peak intensity of the measured transmitted scattered light profile is 1.5% or less, almost no blue haze is observed in the infrared light shielding particle dispersed body prepared by using the boride particle dispersed liquid.

The reason why the visible light transmittance of the boride particle dispersed liquid is set to 50% or less for the measurement is to specify the measurement condition of the intensity of transmitted scattered light (transmitted scattered light profile), and the range is set because the intensity of transmitted scattered light is proportional to the visible light transmittance. Furthermore, the reason for measuring the intensity of transmitted scattered light (transmitted scattered light profile) in the wavelength region of 360 nm or more to 500 nm or less is that scattering in this region is the cause of blue haze.

Furthermore, the boride particle dispersed liquid prepared in the following practical examples and comparative examples were adjusted so that the transmittance of visible light (wavelength of 400 nm or more to 780 nm or less) was 50%, and a spectrophotometer (model: U-4100, manufactured by Hitachi, Ltd.) was used as a spectroscope to measure the peak intensity of the transmitted scattered light profile in the wavelength region of 360 nm or more to 500 nm or less by the methods described with reference to FIGS. 1 and 2.

Furthermore, with respect to the infrared light shielding transparent base, the infrared light shielding particle dispersed body, or the infrared light shielding laminated transparent base prepared in the practical examples and comparative examples, a spectrophotometer (model: U-4100, manufactured by Hitachi, Ltd.) was used as a spectroscope to measure the intensity of transmitted scattered light at intervals of 1 nm in the wavelength range of 300 nm or more to 800 nm or less by the methods described with reference to FIGS. 1 and 2. Then, the peak intensity was obtained from the obtained transmitted scattered light profile.

Note that when evaluating the peak intensity of the transmitted scattered light profile of the infrared light shielding particle dispersed body and the infrared light shielding laminated transparent base, in each of the practical examples and comparative examples, the thickness of the infrared light shielding particle dispersed body was adjusted such that the visible light transmittance became 50%; otherwise, the infrared light shielding particle dispersed body and the infrared light shielding laminated transparent base for measuring the transmitted scattered light profile were prepared and evaluated under the same conditions in the practical examples and comparative examples.

(Haze)

The haze value of the infrared light shielding transparent base, the infrared light shielding particle dispersed body, or the infrared light shielding laminated transparent base prepared in the following practical examples and comparative examples was measured by using a haze meter (model: HM-150, manufactured by Murakami Color Research Laboratory Co., Ltd.), based on JIS K 7105-1981.

(Blue Haze)

Blue haze was visually confirmed upon irradiating the infrared light shielding transparent base, the infrared light shielding particle dispersed body, or the infrared light shielding laminated transparent base prepared in the following practical examples and comparative examples, with light from an artificial solar lamp (XC-100 manufactured by Celic Inc.).

The preparation conditions and evaluation results of the samples in the respective practical examples and comparative examples are described below.

Practical Example 1

Boron carbide was used as a boron source and a reducing agent, and lanthanum oxide was used as a lanthanum source. These materials were weighed and mixed such that B/La that is the element ratio of lanthanum and boron was 5.90. Subsequently, the mixed material was calcined in an argon atmosphere at a temperature condition of 1600±50° C. for 6 hours to obtain a powder including lanthanum hexaboride particles.

The concentration of carbon included in the obtained powder including lanthanum hexaboride particles, was measured by a combustion-infrared absorption method, and the carbon amount was 0.05% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 5.8.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.2% by mass.

Next, 10 parts by weight of the prepared powder including lanthanum hexaboride particles (infrared light shielding material), 80 parts by weight of toluene, and 10 parts by weight of a dispersant (an acrylic-based polymer dispersant having an amino group) were weighed and mixed to obtain a ratio of 10 parts by weight and to prepare 3 kg of slurry. This slurry was charged into a medium stirring mill together with beads, the slurry was circulated, and was pulverized and dispersed for 20 hours.

The used media stirring mill was a horizontal cylindrical annular type (manufactured by Ashizawa Co., Ltd.), and the material of the inner wall of the vessel and the rotor (rotary stirring part) was $ZrO_2$. Furthermore, as the beads, beads made of YSZ (Yttria-Stabilized Zirconia) having a diameter of 0.3 mm were used. The rotation speed of the rotor was set to 13 m/sec and pulverization was carried out at a slurry flow rate of 1 kg/min. The average dispersed particle diameter of the boride particles in the obtained boride particle dispersed liquid was measured to be 70 nm.

Furthermore, regarding the dispersed liquid, as described above, the weight concentration ratio (Zr/La) of Zr and La in the boride particle dispersed liquid and the peak intensity of the transmitted scattered light profile were evaluated.

The results are indicated in Table 1 below.

Furthermore, the obtained dispersed liquid, ultraviolet curing resin, and toluene were mixed at a weight ratio of dispersed liquid: ultraviolet curing resin: toluene=2:1:1, to prepare a coating liquid. The coating liquid was applied on a transparent glass base with a bar coater to form a coating film. At this time, the bar used for coating was selected such that the visible light transmittance of the obtained coating layer was approximately 50%. Note that as the bar coater, IMC-700 manufactured by Imoto Seisakusho, K. K., was used, and the thickness of the obtained coating layer was approximately 10 µm.

Next, by maintaining the coating film at 70° C. for 1 minute, the solvent was evaporated from the coating film, and then the coating film was cured by ultraviolet irradiation. Then, the optical characteristics of the obtained infrared light shielding transparent base were measured. The measurement results are indicated in Table 1 below.

The haze of the obtained infrared light shielding transparent base was 0.2%, and it was confirmed that the transparency was extremely high. Furthermore, the peak intensity of the transmitted scattered light profile in the wavelength range of 360 nm or more to 500 nm or less was 0.6%, and no blue haze was observed when irradiated with artificial sunlight.

Furthermore, the same amount of a dispersant (an acrylic-based polymer dispersant having an amino group) was added to the obtained dispersed liquid, the obtained mixed solution was held in a dryer to remove solvent components and was then pulverized, thereby obtaining an infrared light shielding particle dispersed powder.

The obtained infrared light shielding particle dispersed powder was mixed with a polycarbonate resin, and a pellet-shaped master batch was prepared by using an extruder.

Furthermore, the master batch and the polycarbonate resin were mixed, and an infrared light shielding particle dispersed body was formed by an extruder. At this time, the mixing ratio of the polycarbonate resin and the master batch was adjusted such that the visible light transmittance of the obtained infrared light shielding particle dispersed body was approximately 70%. The measurement results of the optical characteristics of the obtained infrared light shielding particle dispersed body are indicated in the following Table 1.

It was confirmed that light in the visible light region was sufficiently transmitted by a visible light transmittance of approximately 70%. Furthermore, the haze was 0.3%, and it was confirmed that the transparency was extremely high. Furthermore, the peak intensity of the transmitted scattered light profile in the wavelength range of 360 nm to 500 nm was 0.8%, and blue haze (coloring) was not observed when irradiated with artificial sunlight.

Note that in the case of evaluating the peak intensity of the transmitted scattered light profile of the infrared light shielding particle dispersed body or the infrared light shielding laminated transparent base, the infrared light shielding particle dispersed body or the infrared light shielding laminated transparent base for measuring the transmitted scattered light profile described above was prepared and evaluated. The same applies to the other practical examples and comparative examples below.

Practical Example 2

A powder including lanthanum hexaboride particles was obtained in the same manner as in practical example 1, except that boron carbide and lanthanum oxide were weighed and mixed such that the element ratio B/La of lanthanum and boron was 5.95.

The concentration of carbon included in the obtained powder including lanthanum hexaboride particles, was measured by a combustion-infrared absorption method, and the carbon amount was 0.1% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 5.9.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.5% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 3

A powder including lanthanum hexaboride particles was obtained in the same manner as in practical example 1, except that boron carbide and lanthanum oxide were weighed and mixed such that the element ratio B/La of lanthanum and boron was 6.00.

The concentration of carbon included in the obtained powder including lanthanum hexaboride particles, was measured by a combustion-infrared absorption method, and the carbon amount was 0.2% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 5.9.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.9% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 4

A powder including lanthanum hexaboride particles was obtained in the same manner as in practical example 1, except that boron carbide and lanthanum oxide were weighed and mixed such that the element ratio B/La of lanthanum and boron was 6.10.

The concentration of carbon included in the obtained powder including lanthanum hexaboride particles, was measured by a combustion-infrared absorption method, and the carbon amount was 0.2% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.0.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.9% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 5

A powder including lanthanum hexaboride particles was obtained in the same manner as in practical example 1, except that boron carbide and lanthanum oxide were weighed and mixed such that the element ratio B/La of lanthanum and boron was 6.20 and calcined at a temperature condition of 1650±50° C.

The concentration of carbon included in the obtained powder including lanthanum hexaboride particles, was measured by a combustion-infrared absorption method, and the carbon amount was 0.2% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.0.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.9% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 6

A powder including lanthanum hexaboride particles was obtained in the same manner as in practical example 1, except that boron oxide as the boron source, lanthanum oxide as the lanthanum source, and carbon (graphite) as the reducing agent were weighed and mixed such that the element ratio B/La of lanthanum and boron was 6.10. However, 60 parts by weight of carbon was weighed and mixed with 100 parts by weight of boron oxide.

The concentration of carbon included in the obtained powder including lanthanum hexaboride particles, was measured by a combustion-infrared absorption method, and the carbon amount was 0.1% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.0.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 0.4% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 7

A powder including cerium hexaboride particles was obtained in the same manner as in practical example 1, except that cerium oxide was further used in place of lanthanum oxide, such that the element ratio B/Ce of boron and cerium was 6.10.

The concentration of carbon included in the obtained powder including cerium hexaboride particles, was measured by a combustion-infrared absorption method, and the carbon amount was 0.2% by mass. Furthermore, when the composition of the obtained cerium hexaboride particles was evaluated by ICP, m, which is the element ratio (B/Ce) of boron (B) to the cerium element (Ce) in a general formula $CeB_m$, was confirmed to be 6.0.

Furthermore, with respect to the powder including cerium hexaboride particles thus obtained, the $B_4C$ concentration of the powder including cerium hexaboride particles was measured by the above-described method of evaluating the concentration of $B_4C$ in the boride particles, and the measurement result was 0.9% by mass.

Then, a boride particle dispersed liquid was prepared in the same manner as in practical example 1, except that the above-described powder including cerium hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 1 below.

Practical Example 8

To the infrared light shielding particle dispersed liquid (boride particle dispersed liquid) prepared in practical example 1, a dispersant (fatty acid amine-based dispersant) and a plasticizer were added, at a weight ratio of 4:1:10, and the mixture was dried in a reduced-pressure drying machine to remove the solvent components, whereby an infrared light shielding particle plasticizer dispersed liquid was obtained.

The obtained infrared light shielding particle plasticizer dispersed liquid and polyvinyl butyral resin were mixed, and an infrared light shielding particle dispersed body in a sheet form was obtained by an extruder.

At this time, the mixing ratio was adjusted such that the visible light transmittance of the finally obtained infrared light shielding laminated transparent base was approximately 70%.

The obtained sheet-like infrared light shielding particle dispersed body was sandwiched between two glass bases (thickness: 3 mm), and an infrared light shielding laminated transparent base in a laminated glass form was prepared using a heat press machine.

The obtained infrared light shielding laminated transparent base was evaluated in the same manner as in the case of the infrared light shielding particle dispersed body of practical example 1. The results are indicated in Table 1 below.

Comparative Example 1

Boron carbide was used as a boron source and a reducing agent, and lanthanum oxide was used as a lanthanum source. These materials were weighed and mixed such that B/La that is the element ratio of lanthanum and boron was 6.10. Subsequently, the mixed material was calcined in an argon atmosphere at a temperature condition of 1480±50° C. for 6 hours to obtain a powder including lanthanum hexaboride particles.

The concentration of carbon included in the obtained powder including lanthanum hexaboride particles, was measured by a combustion-infrared absorption method, and the carbon amount was 0.6% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.0.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 2.6% by mass.

Then, a boride particle dispersed liquid was prepared in the same manner as in practical example 1, except that the above-described powder including lanthanum hexaboride particles was used.

The obtained dispersed liquid was evaluated in the same manner as in practical example 1. The results are indicated in Table 2 below.

Note that in order to prepare the dispersed liquid, when the pulverization treatment was carried out for 20 hours, the average dispersed particle diameter was 105 nm, which was larger than 100 nm, but because the slurry viscosity increased, the pulverization efficiency significantly decreased, and therefore it was determined that even by further continuing the pulverization treatment, it is difficult to obtain a particle diameter of 100 nm or less.

Furthermore, Zr/La in the obtained boride particle dispersed liquid was 1.8, which was higher than that in practical examples 1 to 8, and it was found that the media beads were abraded in large amounts and mixed in the slurry.

Furthermore, the peak value of the intensity of transmitted scattered light was 1.8%, which was higher than those in practical examples 1 to 8, and there is concern that blue haze will be strongly observed when an optical member is fabricated by using the boride particle dispersed liquid obtained in comparative example 1.

By using the obtained dispersed liquid, a coating layer was formed on a transparent glass base in the same manner as in practical example 1 to obtain an infrared light shielding transparent base. Then, the optical characteristics of the obtained infrared light shielding transparent base were measured. The measurement results are indicated in Table 2 below.

The obtained infrared light shielding transparent base had a haze of 1.6%, and it was confirmed that transparency was very low. Also, the peak intensity of the transmitted scattered light profile in the wavelength region of 360 nm or more to 500 nm or less was 1.9%, and when irradiated with artificial sunlight, blue haze was visually clearly confirmed.

Furthermore, the same amount of dispersant (an acrylic-based polymer dispersant having an amino group) was added to the obtained dispersed liquid, the obtained mixed solution was held in a dryer to remove solvent components and was then pulverized, thereby obtaining an infrared light shielding particle dispersed powder.

The obtained infrared light shielding particle dispersed powder was mixed with a polycarbonate resin, and a pellet-shaped master batch was prepared by using an extruder.

Furthermore, the master batch and the polycarbonate resin were mixed, and an infrared light shielding particle dispersed body was formed by an extruder. At this time, the mixing ratio of the polycarbonate resin and the master batch was adjusted such that the visible light transmittance of the obtained infrared light shielding particle dispersed body was approximately 70%. The measurement results of the optical characteristics of the obtained infrared light shielding particle dispersed body are indicated in the following Table 2.

It was confirmed that light in the visible light region was sufficiently transmitted by a visible light transmittance of approximately 70%. Furthermore, the haze was 0.3%, and it was confirmed that the transparency was extremely high. Furthermore, the peak intensity of the transmitted scattered light profile in the wavelength range of 360 nm to 500 nm was 0.8%, and blue haze (coloring) was not observed when irradiated with artificial sunlight.

It was confirmed that light in the visible light region was sufficiently transmitted by a visible light transmittance of approximately 70%. However, the haze was 1.6%, and it was confirmed that the transparency was extremely low. Furthermore, the peak intensity of the transmitted scattered light profile in the wavelength region of 360 nm to 500 nm was 2.0%, and blue haze was visually clearly confirmed when irradiated with artificial sunlight.

Comparative Example 2

A powder including lanthanum hexaboride particles was obtained in the same manner as in comparative example 1, except that boron carbide and lanthanum oxide were weighed and mixed such that the element ratio B/La of lanthanum and boron was 6.20.

The concentration of carbon included in the obtained powder including lanthanum hexaboride particles, was measured by a combustion-infrared absorption method, and the carbon amount was 0.8% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.1.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 3.7% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 2 below.

Note that in order to prepare the dispersed liquid, when the pulverization treatment was carried out for 20 hours, the average dispersed particle diameter was 111 nm, which was larger than 100 nm, but because the slurry viscosity increased, the pulverization efficiency significantly decreased, and therefore it was determined that even by further continuing the pulverization treatment, it is difficult to obtain a particle diameter of 100 nm or less.

Furthermore, Zr/La in the obtained boride particle dispersed liquid was 2.0, which was higher than that in practical examples 1 to 8, and it was found that the media beads were abraded in large amounts and mixed in the slurry.

Furthermore, the peak intensity of transmitted scattered light was 2.4%, which was higher than those in practical examples 1 to 8, and there is concern that blue haze will be strongly observed when an optical member is fabricated by using the boride particle dispersed liquid obtained in comparative example 2.

Furthermore, by using the obtained dispersed liquid, a coating layer was formed on a glass base in the same manner as in practical example 1. Then, the optical characteristics of the obtained infrared light shielding transparent base were measured. The measurement results are indicated in Table 2 below.

The obtained infrared light shielding transparent base had a haze of 1.8%, and it was confirmed that transparency was very low. Also, the peak intensity of the transmitted scattered light profile in the wavelength region of 360 nm or more to 500 nm or less was 2.4%, and when irradiated with artificial sunlight, blue haze was visually clearly confirmed, similar to comparative example 1.

Comparative Example 3

A powder including lanthanum hexaboride particles was obtained in the same manner as in comparative example 1, except that boron oxide as the boron source, lanthanum oxide as the lanthanum source, and carbon (graphite) as the reducing agent were weighed and mixed such that the element ratio B/La of lanthanum and boron was 6.10. However, 60 parts by weight of carbon was weighed and mixed with 100 parts by weight of boron oxide.

The concentration of carbon included in the obtained powder including lanthanum hexaboride particles, was measured by a combustion-infrared absorption method, and the carbon amount was 0.7% by mass. Furthermore, when the composition of the obtained lanthanum hexaboride particles was evaluated by ICP, m, which is the element ratio (B/La) of boron (B) to the lanthanum element (La) in the general formula $LaB_m$, was confirmed to be 6.0.

Furthermore, with respect to the obtained powder including lanthanum hexaboride particles, the $B_4C$ concentration in the powder including lanthanum hexaboride particles was measured by the above-described method of evaluating the concentration of $B_4C$ in the boride particles, and the measurement result was 3.4% by mass.

Then, a boride particle dispersed liquid was prepared in the same manner as in practical example 1, except that the above-described powder including lanthanum hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 2 below.

The obtained infrared light shielding transparent base had a haze of 1.7%, and it was confirmed that transparency was very low. Also, the peak intensity of the transmitted scattered light profile in the wavelength region of 360 nm or more to 500 nm or less was 2.2%, and when irradiated with artificial sunlight, blue haze was visually clearly confirmed, similar to comparative example 1.

Comparative Example 4

A powder including cerium hexaboride particles was obtained in the same manner as in comparative example 1, except that cerium oxide was further used in place of lanthanum oxide, such that the element ratio B/Ce of boron and cerium was 6.10.

The concentration of carbon included in the obtained powder including cerium hexaboride particles, was measured by a combustion-infrared absorption method, and the carbon amount was 0.9% by mass. Furthermore, when the composition of the obtained cerium hexaboride particles was evaluated by ICP, m, which is the element ratio (B/Ce) of boron (B) to the cerium element (Ce) in the general formula $CeB_m$, was confirmed to be 6.0.

Furthermore, with respect to the powder including cerium hexaboride particles thus obtained, the $B_4C$ concentration in the powder including cerium hexaboride particles was measured by the above-described method of evaluating the concentration of $B_4C$ in the boride particles, and the measurement result was 4.4% by mass.

Then, a boride particle dispersed liquid was prepared in the same manner as in practical example 1, except that the above-described powder including cerium hexaboride particles was used. Furthermore, by using the obtained dispersed liquid, an infrared light shielding transparent base, an infrared light shielding particle dispersed powder, a master batch, and an infrared light shielding particle dispersed body were prepared in the same manner as in practical example 1.

The dispersed liquid, the infrared light shielding transparent base, and the infrared light shielding particle dispersed body thus obtained were evaluated in the same manner as in practical example 1. The results are indicated in Table 2 below.

The obtained infrared light shielding transparent base had a haze of 1.9%, and it was confirmed that transparency was very low. Also, the peak intensity of the transmitted scattered light profile in the wavelength region of 360 nm or more to 500 nm or less was 2.5%, and when irradiated with artificial sunlight, blue haze was visually clearly confirmed, similar to comparative example 1.

TABLE 1

| | | | Practical example 1 | Practical example 2 | Practical example 3 | Practical example 4 |
|---|---|---|---|---|---|---|
| Producing conditions | | Raw material | Boron carbide, lanthanum oxide | Boron carbide, lanthanum oxide | Boron carbide, lanthanum oxide | Boron carbide, lanthanum oxide |
| | | Element ratio (B/X) of B and metal element X in raw material | 5.90 | 5.95 | 6.00 | 6.10 |
| | | Calcining temperature | 1600 ± 50° C. | 1600 ± 50° C. | 1600 ± 50° C. | 1600 ± 50° C. |
| Evaluation result | Boride particles | Element ratio (B/X) of B and metal element X in boride particles | 5.8 | 5.9 | 5.9 | 6.0 |
| | | Carbon concentration/% by mass in boride particles | 0.05 | 0.1 | 0.2 | 0.2 |
| | | Boron carbide concentration/% by mass in boride particles | 0.2 | 0.5 | 0.9 | 0.9 |
| | Boride particle dispersed liquid | Average dispersed particle diameter/nm | 70 | 75 | 82 | 77 |
| | | Weight concentration ratio (Zr/X) of Zr and metal element X in boride particle dispersed liquid | 1.3 | 1.4 | 1.4 | 1.4 |
| | | Peak intensity/% of transmitted scattered light profile | 0.6 | 0.7 | 0.8 | 0.8 |
| | Infrared light shielding transparent base | Visible light transmittance/% | 50 | 50 | 50 | 50 |
| | | Haze/% | 0.2 | 0.2 | 0.4 | 0.4 |
| | | Peak intensity/% of transmitted scattered light profile | 0.6 | 0.7 | 0.8 | 0.8 |
| | | Blue haze/% | NO | NO | NO | NO |
| | Infrared light shielding particle dispersed body/infrared ray shielding laminated transparent base (practical example | Visible light transmittance/% | 70 | 70 | 70 | 70 |
| | | Haze/% | 0.3 | 0.3 | 0.3 | 0.3 |
| | | Peak intensity/% of transmitted scattered light profile | 0.8 | 0.9 | 0.9 | 0.9 |
| | | Blue haze/% | NO | NO | NO | NO |

TABLE 1-continued

|  |  |  | Practical example 5 | Practical example 6 | Practical example 7 | Practical example 8 |
|---|---|---|---|---|---|---|
| Producing conditions |  | Raw material | Boron carbide, lanthanum oxide | Boron oxide, lanthanum oxide, carbon (graphite) | Boron carbide, cerium oxide | Same as practical example 1 |
|  |  | Element ratio (B/X) of B and metal element X in raw material | 6.20 | 6.10 | 6.10 | Same as practical example 1 |
|  |  | Calcining temperature | 1650 ± 50° C. | 1600 ± 50° C. | 1600 ± 50° C. | Same as practical example 1 |
| Evaluation result | Boride particles | Element ratio (B/X) of B and metal element X in boride particles | 6.0 | 6.0 | 6.0 | Same as practical example 1 |
|  |  | Carbon concentration/% by mass in boride particles | 0.2 | 0.1 | 0.2 | Same as practical example 1 |
|  |  | Boron carbide concentration/% by mass in boride particles | 0.9 | 0.4 | 0.9 | Same as practical example 1 |
|  | Boride particle dispersed liquid | Average dispersed particle diameter/nm | 71 | 78 | 75 | Same as practical example 1 |
|  |  | Weight concentration ratio (Zr/X) of Zr and metal element X in boride particle dispersed liquid | 1.4 | 1.4 | 1.4 | Same as practical example 1 |
|  |  | Peak intensity/% of transmitted scattered light profile | 0.8 | 0.7 | 0.7 | Same as practical example 1 |
|  | Infrared light shielding transparent base | Visible light transmittance/% | 50 | 50 | 50 |  |
|  |  | Haze/% | 0.4 | 0.4 | 0.4 |  |
|  |  | Peak intensity/% of transmitted scattered light profile | 0.8 | 0.8 | 0.8 |  |
|  |  | Blue haze/% | NO | NO | NO |  |
|  | Infrared light shielding particle dispersed body/infrared ray shielding laminated transparent base (practical example 8) | Visible light transmittance/% | 70 | 70 | 70 | 72 |
|  |  | Haze/% | 0.3 | 0.3 | 0.3 | 0.4 |
|  |  | Peak intensity/% of transmitted scattered light profile | 0.9 | 0.9 | 0.9 | 1.0 |
|  |  | Blue haze/% | NO | NO | NO | NO |

TABLE 2

|  |  |  | Comparative example 1 | Comparative example 2 | Comparative example 3 | Comparative example 4 |
|---|---|---|---|---|---|---|
| Producing conditions |  | Raw material | Boron carbide, lanthanum oxide | Boron carbide, lanthanum oxide | Boron oxide, lanthanum oxide, carbon (graphite) | Boron carbide, cerium oxide |
|  |  | Element ratio (B/X) of B and metal element X in raw material | 6.10 | 6.20 | 6.10 | 6.10 |
|  |  | Calcining temperature | 1480 ± 50° C. | 1480 ± 50° C. | 1480 ± 50° C. | 1480 ± 50° C. |
| Evaluation result | Boride particles | Element ratio (B/X) of B and metal element X in boride particles | 6.0 | 6.1 | 6.0 | 6.0 |
|  |  | Carbon concentration/% by mass in boride particles | 0.6 | 0.8 | 0.7 | 0.9 |
|  |  | Boron carbide concentration/% by mass in boride particles | 2.6 | 3.7 | 3.4 | 4.4 |
|  | Boride particle dispersed liquid | Average dispersed particle diameter/nm | 105 | 111 | 108 | 112 |
|  |  | Weight concentration ratio (Zr/X) of Zr and | 1.8 | 2.0 | 1.8 | 1.8 |

TABLE 2-continued

|  |  | Comparative example 1 | Comparative example 2 | Comparative example 3 | Comparative example 4 |
|---|---|---|---|---|---|
|  | metal element X in boride particle dispersed liquid Peak intensity/% of transmitted scattered light profile | 1.8 | 2.4 | 2.1 | 2.2 |
| Infrared light shielding transparent base | Visible light transmittance/% | 50 | 50 | 50 | 50 |
|  | Haze/% | 1.6 | 1.8 | 1.7 | 1.9 |
|  | Peak intensity/% of transmitted scattered light profile | 1.9 | 2.4 | 2.2 | 2.5 |
|  | Blue haze/% | YES | YES | YES | YES |
| Infrared light shielding particle dispersed body | Visible light transmittance/% | 70 | 70 | 70 | 70 |
|  | Haze/% | 1.6 | 2.0 | 1.9 | 2.1 |
|  | Peak intensity/% of transmitted scattered light profile | 2.0 | 2.5 | 2.4 | 2.6 |
|  | Blue haze/% | YES | YES | YES | YES |

In practical examples 1 to 8, it has been confirmed that boride particles obtained by a solid-phase reaction, etc., can be pulverized relatively easily and economically to have an average dispersed particle diameter of 100 nm or less, particularly 85 nm or less, to obtain finer particles. Furthermore, in practical examples 1 to 8, the average dispersed particle diameter of the obtained boride particles was 100 nm or less, particularly 85 nm or less, and therefore an infrared light shielding film, an infrared light shielding transparent base including a coating layer, and an infrared light shielding particle dispersed body prepared by using the particles or the dispersed liquid of practical examples 1 to 8 are not colored to bluish white when irradiated with artificial sunlight. That is, it is confirmed that blue haze is suppressed.

Accordingly, it has been confirmed that an infrared light shielding film, an infrared light shielding transparent base, an infrared light shielding optical member including an infrared light shielding transparent base, an infrared light shielding particle dispersed body, and an infrared light shielding laminated transparent base, etc., which are prepared by using the boride particle dispersed liquid of practical examples 1 to 8, are suitably used for a windowpane for building materials and a windowpane of a vehicle, etc.

Note that in each of practical examples 1 to 7, the thickness of the coating layer was approximately 10 μm, and 20 μm or less.

On the other hand, in comparative examples 1 to 4 in which the powder including boride particles having a carbon concentration of 0.2% by mass or more was used as the raw material, when the pulverization treatment was carried out for 20 hours, the average dispersed particle diameter was larger than 100 nm, and because the viscosity increased, it was confirmed that even by further continuing the pulverization treatment, it is difficult to obtain a particle diameter of 100 nm or less. Furthermore, the peak intensity of the transmitted scattered light profile of the boride particle dispersed liquid was also higher than 1.5%. For this reason, it was confirmed that there is concern that blue haze will occur in the infrared light shielding transparent base, etc., prepared by using such a boride particle dispersed liquid. Furthermore, there was a problem in applying these materials to a windowpane for building materials or a windowpane of a vehicle.

Boride particles, a boride particle dispersed liquid, an infrared light shielding transparent base, an infrared light shielding optical member, an infrared light shielding particle dispersed body, an infrared light shielding laminated transparent base, an infrared light shielding particle dispersed powder, and a master batch have been described above with reference to embodiments and practical examples, etc.; however, the present invention is not limited to the above-described embodiments and practical examples, etc. Various modifications and changes may be made within the scope of the gist of the present invention described in the claims.

The present international patent application claims the benefit of priority of Japanese Patent Application No. 2016-000298, filed on Jan. 4, 2016, Japanese Patent Application No. 2016-000300, filed on Jan. 4, 2016, Japanese Patent Application No. 2016-000301, filed on Jan. 4, 2016, Japanese Patent Application No. 2016-254433, filed on Dec. 27, 2016, Japanese Patent Application No. 2016-254437, filed on Dec. 27, 2016, and Japanese Patent Application No. 2016-254440, filed on Dec. 27, 2016, the entire contents of which Japanese Patent Application No. 2016-000298, Japanese Patent Application No. 2016-000300, Japanese Patent Application No. 2016-000301, Japanese Patent Application No. 2016-254433, Japanese Patent Application No. 2016-254437, and Japanese Patent Application No. 2016-254440, are hereby incorporated herein by reference.

The invention claimed is:

1. An infrared light shielding particle dispersed body comprising:
   boride particles represented by a general formula $XB_m$ (where X is La, and m is a number indicating an amount of boron in the general formula), wherein the boride particles are manufactured by preparing a mixture by mixing a boron source and a lanthanum source such that an element ratio B/La of boron in the boron source and lanthanum in the lanthanum source is 5.8 or more and 6.2 or less and by calcining the mixture at a temperature of 1600° C.±50° C. such that an amount of carbon included in the boride particles is 0.05% by mass or more and 0.2% by mass or less, as measured by a combustion-infrared absorption method and an amount of $B_4C$ included in the boride particles is greater than or equal to 0.2% by mass and less than or equal to 0.9% by mass; and
   thermoplastic resin,
   wherein the boride particles are dispersed in the thermoplastic resin and wherein an average dispersed particle diameter of the boride particles is greater than or equal to 70 nm and less than or equal to 82 nm.

2. The infrared light shielding particle dispersed body according to claim 1, wherein m in the general formula $XB_m$ is 4.0 or more and 6.2 or less.

3. The infrared light shielding particle dispersed body according to claim 1, wherein the thermoplastic resin is at least one kind selected from one kind of resin selected from a resin group including polyethylene terephthalate resin, polycarbonate resin, acrylic resin, styrene resin, polyamide resin, polyethylene resin, vinyl chloride resin, olefin resin, epoxy resin, polyimide resin, fluororesin, an ethylene-vinyl acetate copolymer, ionomer resin, polyvinyl butyral resin, and polyvinyl acetal resin, a mixture of two or more kinds of resin selected from the resin group, and a copolymer including two or more kinds of resin selected from the resin group.

4. The infrared light shielding particle dispersed body according to claim 1, wherein the infrared light shielding particle dispersed body has a sheet shape, a board shape, or a film shape.

5. The infrared light shielding particle dispersed body according to claim 1, wherein a content of the boride particles per unit projected area is 0.01 $g/m^2$ or more and 1.0 $g/m^2$ or less.

6. The infrared light shielding particle dispersed body according to claim 1, wherein a peak intensity of a transmitted scattered light profile is 1.5% or less in a wavelength region of 360 nm or more and 500 nm or less, in a case where a transmittance of visible light is set to 45% or more and 55% or less.

7. An infrared light shielding laminated transparent base comprising:

a plurality of transparent bases; and the infrared light shielding particle dispersed body according to claim 1, wherein the infrared light shielding particle dispersed body is arranged between the plurality of transparent bases.

* * * * *